United States Patent
Osaki et al.

(10) Patent No.: US 9,778,023 B2
(45) Date of Patent: Oct. 3, 2017

(54) OPTICAL COORDINATE MEASURING DEVICE

(71) Applicant: Keyence Corporation, Osaka (JP)

(72) Inventors: Michio Osaki, Osaka (JP); Jun Usami, Osaka (JP)

(73) Assignee: Keyence Corporation, Osaka (JP)

( * ) Notice: Subject to any disclaimer, the term of this patent is extended or adjusted under 35 U.S.C. 154(b) by 252 days.

(21) Appl. No.: 14/660,959

(22) Filed: Mar. 18, 2015

(65) Prior Publication Data

US 2015/0300808 A1    Oct. 22, 2015

(30) Foreign Application Priority Data

Apr. 18, 2014  (JP) ................................ 2014-086471

(51) Int. Cl.
*G01B 11/24*    (2006.01)
*G01B 11/00*    (2006.01)

(52) U.S. Cl.
CPC ............ *G01B 11/005* (2013.01); *G01B 11/24* (2013.01)

(58) Field of Classification Search
CPC ..... G01B 11/00; G01B 11/002; G01B 11/005; G01B 11/24; G01B 11/25; G01B 11/30; G01C 3/08; G01C 15/00; G01C 15/002
USPC ........ 33/1 CC, 503, 504; 250/559.22; 356/2, 356/3, 601–612
See application file for complete search history.

(56) References Cited

U.S. PATENT DOCUMENTS

| | | | | |
|---|---|---|---|---|
| 5,000,574 A | * | 3/1991 | Scotese et al. | G01B 11/306 250/237 G |
| 5,305,091 A | * | 4/1994 | Gelbart et al. | G01B 11/002 250/559.33 |
| 5,440,392 A | | 8/1995 | Pettersen et al. | |
| 5,608,528 A | * | 3/1997 | Ogawa | G01C 11/00 250/203.1 |
| 5,805,287 A | | 9/1998 | Pettersen et al. | |
| 5,973,788 A | | 10/1999 | Pettersen et al. | |
| 6,138,367 A | * | 10/2000 | Raby | G01C 1/02 33/1 CC |
| 6,166,809 A | | 12/2000 | Pettersen et al. | |
| 6,389,158 B1 | | 5/2002 | Pettersen et al. | |
| 6,859,286 B2 | * | 2/2005 | Mukherji | G01B 11/024 356/614 |

(Continued)

FOREIGN PATENT DOCUMENTS

JP      06511555 A  * 12/1994  ............. G01B 11/03
WO  WO 9822776 A1  *  5/1998  ............. A61B 5/0066

*Primary Examiner* — R. A. Smith
(74) *Attorney, Agent, or Firm* — Kilyk & Bowersox, P.L.L.C.

(57) ABSTRACT

Provided is an optical coordinate measuring device with improved measurement efficiency. A holding part of a measurement head includes an installation part and a stand part. The installation part has a horizontal flat shape and is installed on an installation surface. The stand part is provided so as to extend upward from one end of the installation part, and a placement table is provided at the other end of the installation part. The main imaging unit is provided on an upper part of the stand part. The main imaging unit is configured detachably with respect to the stand part. The main imaging unit is fixed by the stand part in a constant attitude so as to capture an image of a previously set imaging region.

12 Claims, 16 Drawing Sheets

(56) References Cited

U.S. PATENT DOCUMENTS

| | | | | |
|---|---|---|---|---|
| 6,917,414 | B2* | 7/2005 | Stierle et al. | G01C 3/08 |
| | | | | 342/118 |
| 7,687,754 | B2* | 3/2010 | Eiff et al. | A61C 13/0004 |
| | | | | 250/208.1 |
| 7,751,066 | B2* | 7/2010 | Iwasaki | G06T 7/521 |
| | | | | 250/550 |
| 8,082,120 | B2* | 12/2011 | St-Pierre et al. | G01B 11/2513 |
| | | | | 356/601 |
| 8,233,665 | B2* | 7/2012 | Nakatsukasa | G01B 11/24 |
| | | | | 250/311 |
| 8,358,424 | B2* | 1/2013 | Toyoda et al. | G01B 11/026 |
| | | | | 356/614 |
| 8,384,890 | B2* | 2/2013 | Banner et al. | G01B 11/24 |
| | | | | 356/241.1 |
| 8,650,939 | B2* | 2/2014 | Matsumiya et al. | G01B 5/008 |
| | | | | 73/104 |
| 8,874,406 | B2 | 10/2014 | Rotvold et al. | |
| 8,970,823 | B2* | 3/2015 | Heidemann et al. | G01B 11/25 |
| | | | | 356/2 |
| 9,245,062 | B2* | 1/2016 | Rueb | G01C 11/00 |
| 2006/0077286 | A1* | 4/2006 | Wenderski | F16M 11/40 |
| | | | | 348/373 |
| 2012/0186365 | A1* | 7/2012 | Beyeler et al. | B81C 99/003 |
| | | | | 73/862.541 |
| 2012/0262695 | A1* | 10/2012 | Faul et al. | G01C 3/08 |
| | | | | 356/3.13 |
| 2014/0259714 | A1* | 9/2014 | Atwell et al. | G01C 15/00 |
| | | | | 33/503 |

\* cited by examiner

OPTICAL COORDINATE MEASURING DEVICE

CROSS-REFERENCE TO RELATED APPLICATIONS

The present application claims foreign priority based on Japanese Patent Application No. 2014-086471, filed Apr. 18, 2014, the contents of which is incorporated herein by reference.

BACKGROUND OF THE INVENTION

1. Field of the Invention

The present invention relates to an optical coordinate measuring device using a probe.

2. Description of Related Art

An optical coordinate measuring device is provided with a probe for designating a measurement position. An arbitrary position of a measurement target is designated as a measurement position by the probe, and coordinates of the measurement position are calculated. By calculating coordinates of a plurality of measurement positions on the measurement target, a size of a desired portion of the measurement target is measured.

JP 06-511555 A describes a system for point by point measurement of spatial coordinates, which includes a data processor, a contact probe, and an angle sensor. The contact probe is provided with a plurality of point light sources in addition to a contact point. The angle sensor is provided so as to allow observation of an essential portion of a measurement target and allow observation of the plurality of point light sources of the contact probe.

A spatial direction from the angle sensor toward each light source is recorded. Based on the recorded spatial direction, a position and an orientation of the contact probe with respect to the angle sensor are calculated by a data processor. The position of the contact probe and a position of the contact point are associated with a position of the measurement target.

SUMMARY OF THE INVENTION

In the system for point by point measurement in JP 06-511555 A, it is necessary to fix the angle sensor by use of a fixing tool such as a tripod so as to allow observation of the target and the plurality of point light sources of the contact probe. In this case, as for a relatively large-sized measurement target, measurement can be performed with certain efficiency. In contrast, as for a relatively small-sized measurement target, performing a procedure of preparing the fixing tool, fixing the angle sensor, and the like causes deterioration in measurement efficiency. Further, when an attempt is made to realize high measurement accuracy such as several μm to several tens of μm by means of an optical measuring device, a measurement target range is relatively restricted. This makes adjustment of the fixing tool such as the tripod to take time or makes it hard for a user to recognize the measurement target range. These also become the cause of deterioration in measurement efficiency.

An object of the present invention is to provide an optical coordinate measuring device with improved measurement efficiency.

(1) An optical coordinate measuring device according to the present invention includes: a probe which has a plurality of markers and is configured to designate a measurement position; an imaging unit which captures images of the plurality of markers of the probe; a calculation unit which calculates coordinates of a measurement position designated by the probe based on a result of the imaging by the imaging unit, and a fixing member which fixes the imaging unit in a constant attitude such that the imaging unit captures an image of a previously set imaging region, wherein the imaging unit is detachable with respect to the fixing member.

In this optical coordinate measuring device, images of the plurality of markers of the probe are captured by the imaging unit, and based on a result of the imaging, coordinates of the measurement position designated by the probe are calculated by the calculation unit.

The imaging unit is fixed by the fixing member in a constant attitude so as to capture an image of the previously set imaging region. This eliminates the need for an operation for adjusting the position and the attitude of the imaging unit, leading to improvement in measurement efficiency. Further, since the imaging region is limited, it is possible to perform measurement with high accuracy.

Further, since the imaging unit is detachable with respect to the fixing member, calibration and maintenance of the imaging unit can be easily performed. This reduces a workload for keeping the accuracy of the imaging unit.

(2) The fixing member may fix the imaging unit so as to capture an image of a region obliquely below the imaging unit.

In this case, an increase in size of the optical coordinate measuring device is suppressed.

(3) The optical coordinate measuring device may further include a placement table on which a measurement target is placed; and a base which holds the placement table, the fixing member may be fixed to the base, and the imaging unit may capture an image of a region on the placement table as the imaging region.

In this case, the imaging unit and the placement table are integrally held by the base and the fixing member, to thereby facilitate handling of the optical coordinate measuring device. Further, since the region on the placement table becomes the imaging region, a user can easily recognize the imaging region. This leads to improvement in measurement efficiency.

(4) The imaging unit may include a first storage unit which stores first calibration information indicating characteristics of the imaging unit.

In this case, it is possible to perform measurement by use of the first calibration information stored in the first storage unit of the imaging unit. Therefore, even when the imaging unit is calibrated in a state where the imaging unit has been removed from the fixing member, the obtained first calibration information is not required be stored into another storage apparatus, but may only be stored into the first storage unit of the imaging unit. This reduces a workload for calibration of the imaging unit.

(5) The probe may be connected to the calculation unit by wire or wirelessly.

In this case, handling of the probe is facilitated. This facilitates specification of the measurement position by use of the probe, and also facilitates calibration and maintenance of the probe.

(6) The probe may include a second storage unit which stores second calibration information indicating characteristics of the probe. In this case, the second calibration information obtained by calibration of the probe is not required be stored into another storage apparatus, but can be stored into the second storage unit of the probe, thereby reducing a workload for calibration of the probe.

(7) The probe may have a grip part which is provided so as to extend in a first direction and is gripped by a user, and a body part which is provided at an upper end of the grip part so as to extend in a second direction, the second direction forming an angle with respect to the first direction, the plurality of markers may be provided on an upper surface of the body part, and a contact part to be brought into contact with the measurement target is provided at an end of the body part.

In this case, the user can easily turn the upper surface of the body part to the imaging unit while gripping the grip part. Accordingly, images of the plurality of markers, provided on the upper surface of the body part, can be easily captured by the imaging unit.

According to the present invention, the measurement efficiency is improved.

DETAILED DESCRIPTION OF PREFERRED EMBODIMENTS

(1) Configuration of Optical Coordinate Measuring Device

Figure 1:
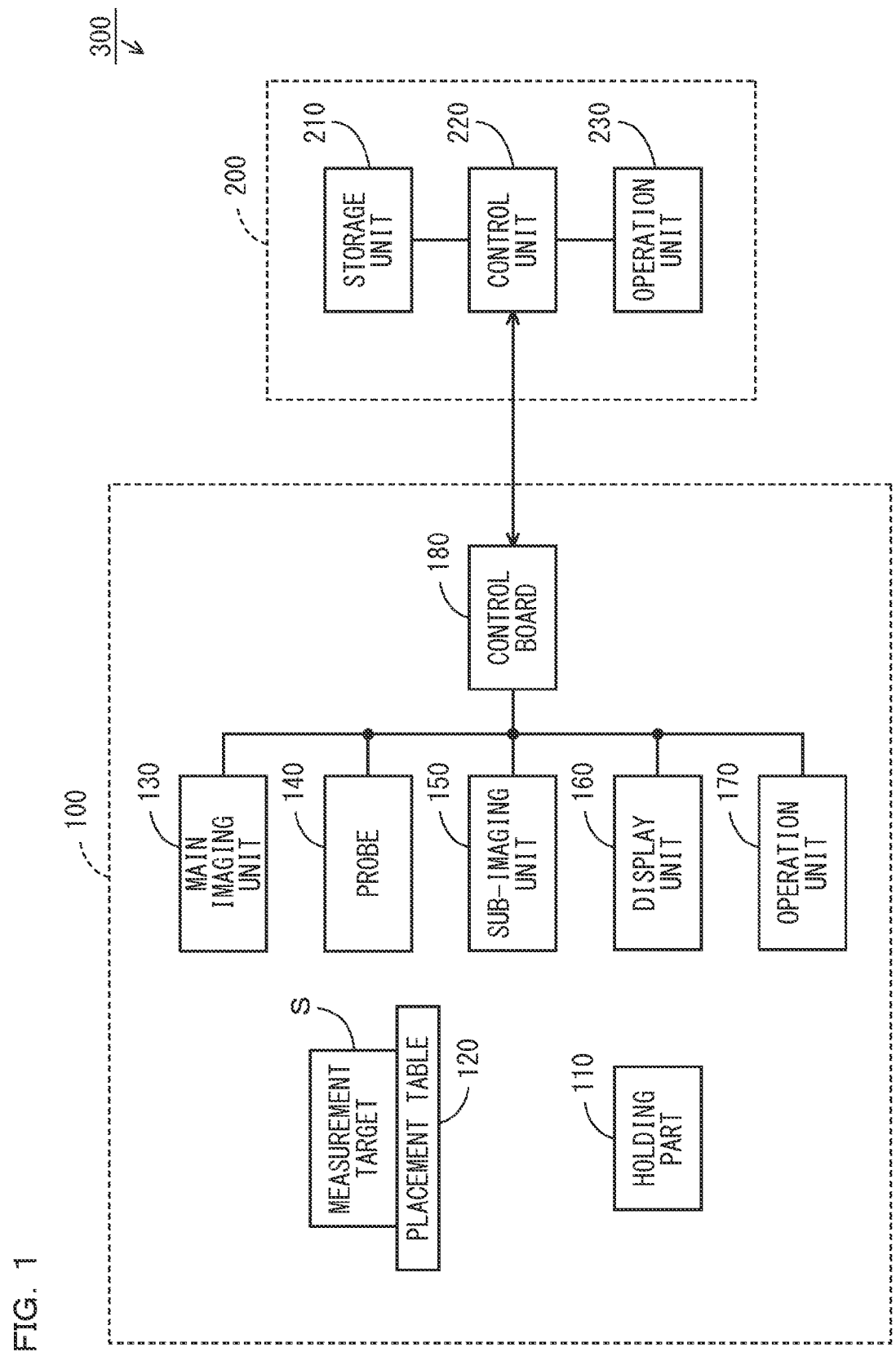
FIG. 1 is a block diagram showing a configuration of an optical coordinate measuring device according to one embodiment of the present invention.
Figure 2:
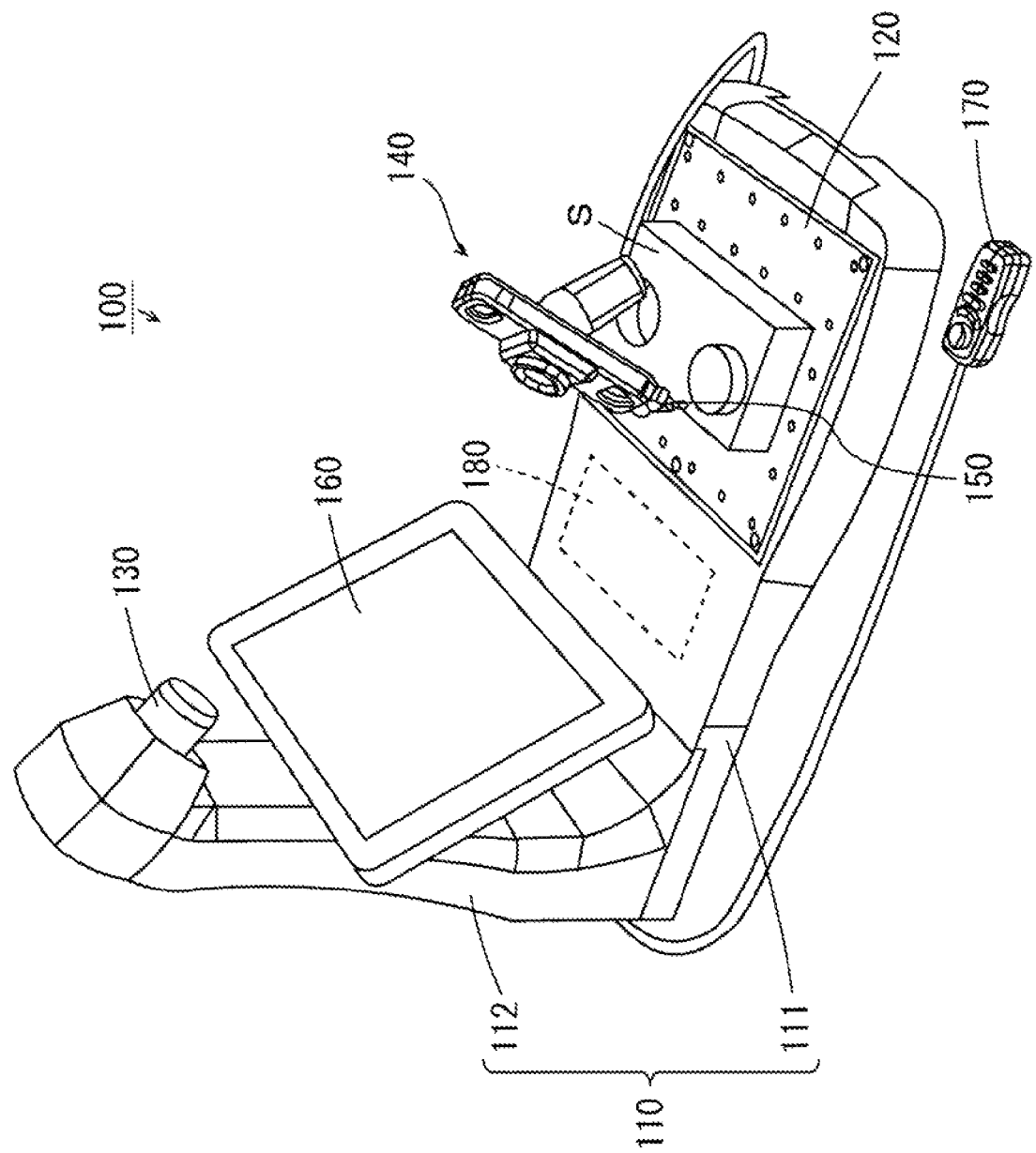
FIG. 2 is a perspective view showing a configuration of a measurement head of the optical coordinate measuring device of FIG. 1.
Figure 3:
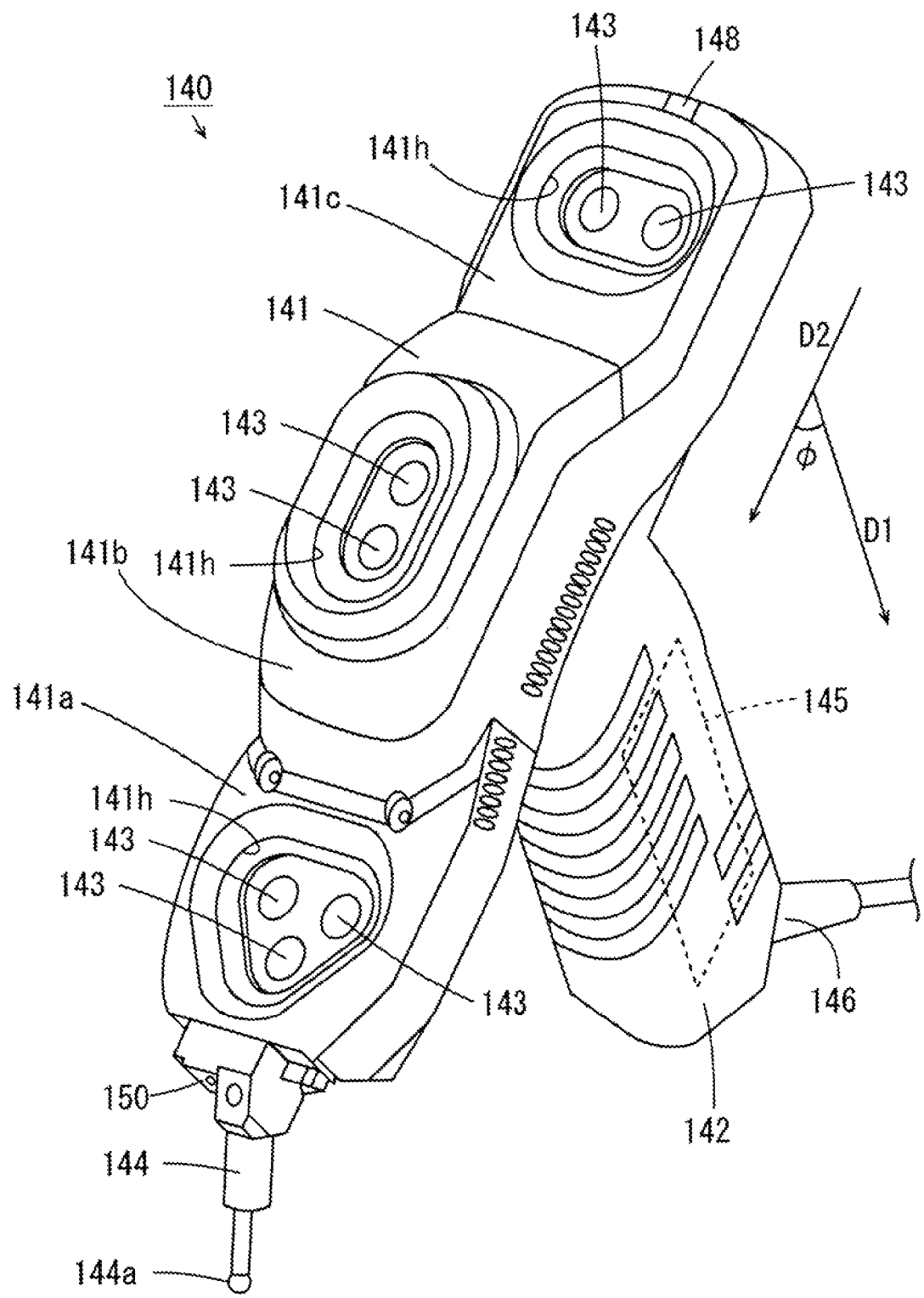
FIG. 3 is a perspective view showing a configuration of a probe of the measurement head of FIG. 2.

FIG. 1 is a block diagram showing a configuration of an optical coordinate measuring device according to one embodiment of the present invention. FIG. 2 is a perspective view showing a configuration of a measurement head of an optical coordinate measuring device 300 of FIG. 1. FIG. 3 is a perspective view showing a configuration of a probe of a measurement head 100 of FIG. 2. Hereinafter, the optical coordinate measuring device 300 according to the present embodiment will be described with reference to FIGS. 1 to 3. As shown in FIG. 1, the optical coordinate measuring device 300 is provided with the measurement head 100 and a processing device 200. The measurement head 100 includes a holding part 110, a placement table 120, a main imaging unit 130, a probe 140, a sub-imaging unit 150, a display unit 160, an operation unit 170, and a control board 180.

As shown in FIG. 2, the holding part 110 of the measurement head 100 includes an installation part 111 and a stand part 112. The installation part 111 has a horizontal flat shape and is installed on the installation surface. The stand part 112 is provided so as to extend upward from one end of the installation part 111.

The placement table 120 is provided at the other end of the installation part 111. The placement table 120 is an optical surface plate, for example. A measurement target S is placed on the placement table 120. In this example, the placement table 120 has a substantially square shape. On the placement table 120, a plurality of screw holes are formed so as to be arrayed at regular intervals in two directions orthogonal to each other. Hence, it is possible to fix the measurement target S to the placement table 120 by means of an upper cramp member and fixing screws. The placement table 120 may have magnetism. In this case, it is possible to fix the measurement target S to the placement table 120 by means of a fixing member using a magnet such as a magnet base. Further, the upper surface of the placement table 120 may have adhesiveness. Also in this case, the measurement target S can be easily fixed to the placement table 120. Note that the placement table 120 may be detachably formed. For example, the placement table 120 having an adhesive upper surface may be realized by fixing, by means of screws, a plate member having an adhesive upper surface to the placement table 120 provided with a plurality of screw holes.

Figure 4:
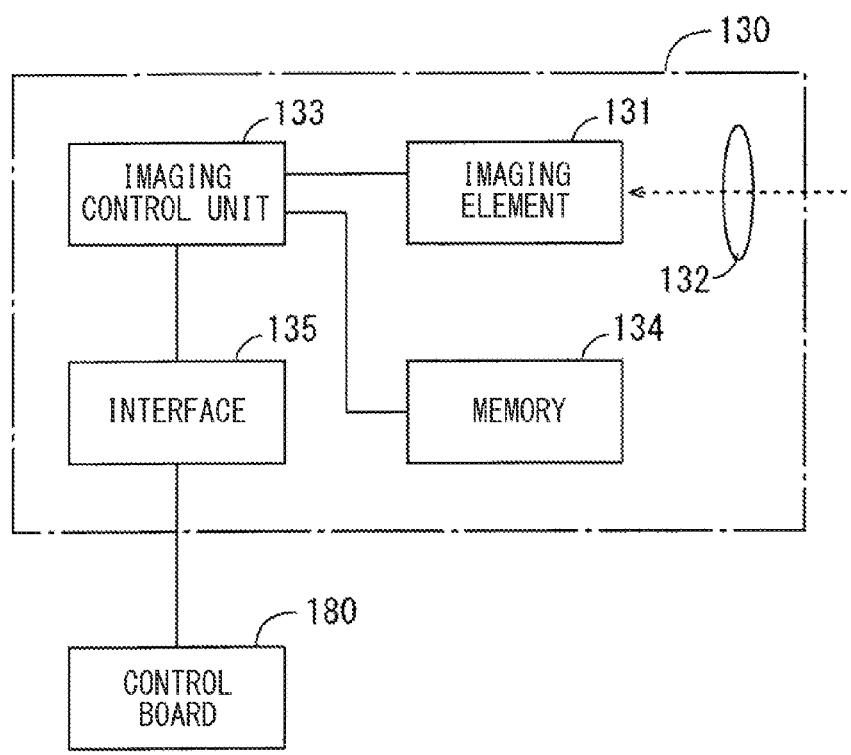
FIG. 4 is a block diagram for describing a configuration of a main imaging unit.
Figure 10:
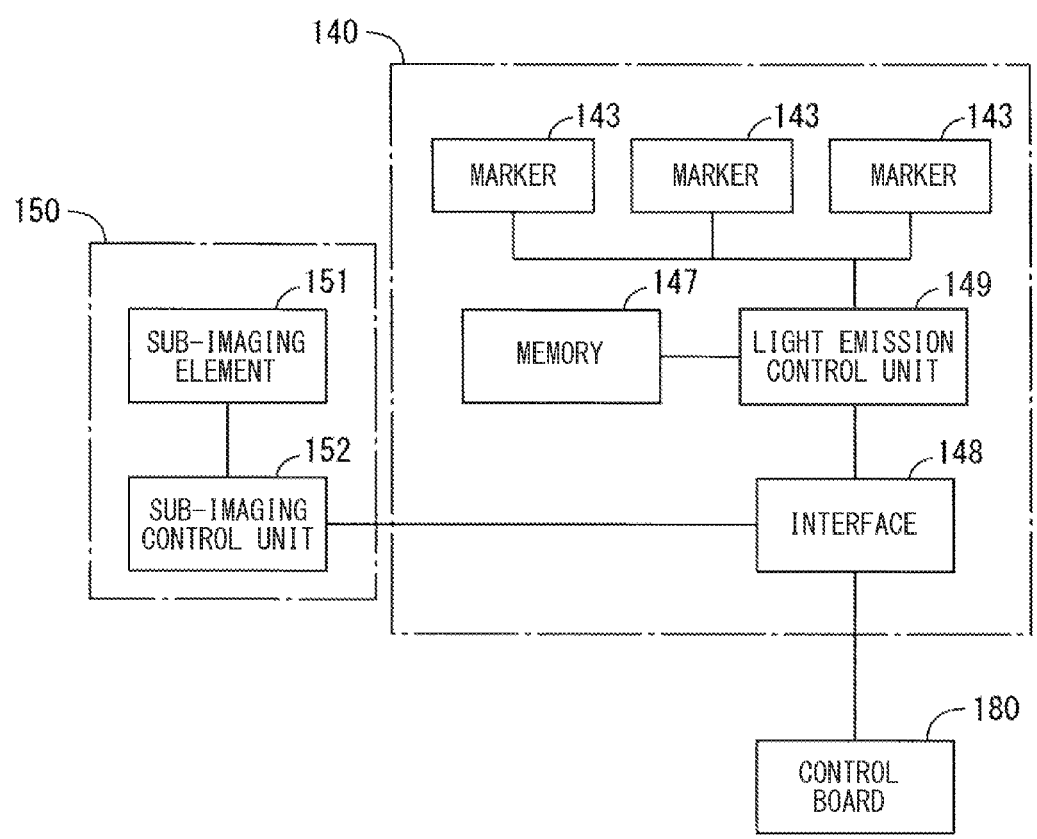
FIG. 10 is a block diagram showing an internal configuration of a probe and a sub-imaging unit.

The main imaging unit 130 is provided on an upper part of the stand part 112. The main imaging unit 130 is configured detachably with respect to the stand part 112. The main imaging unit 130 includes an imaging element 131 (FIG. 4 described later) and a plurality of lenses 132 (FIG. 4 described later). In the present embodiment, the imaging element 131 is a CMOS (complementary metal-oxide-semiconductor) image sensor capable of detecting infrared rays. The main imaging unit 130 is fixed by the stand part 112 in a constant attitude so as to capture an image of a previously set imaging region V (FIG. 10 described later). In this example, the main imaging unit 130 is fixed so as to capture an image of a region obliquely below the main imaging unit 130. A detail of the main imaging unit 130 will be described later.

The imaging region V (FIG. 10) is a certain region including the placement table 120 of the installation part 111 and its periphery. In the present embodiment, the placement table 120 of FIG. 1 and a region projecting from the placement table 120 only by a dimension of an overall length of the probe 140 of FIG. 1 are defined as the imaging region V. Note that the overall length of the probe 140 is approximately 150 mm, for example. An analog electric signal (hereinafter referred to as light reception signal) corresponding to a detected amount is outputted from each pixel of the imaging element 131 (FIG. 4) of the main imaging unit 130 to the control board 180.

As shown in FIG. 3, the probe 140 includes a housing 141, a grip part 142, a plurality of markers 143, a stylus 144, a power supply board 145, and a connection terminal 146. The grip part 142 extends in a first direction D1, and the housing 141 extends in a second direction D2 intersecting with the first direction D1. A user grips the grip part 142 and operates the probe 140.

Hereinafter, unless specifically mentioned, the top, bottom, front, and rear of the probe 140 indicate the top, bottom, front, and rear of the probe 140 in a state where the user vertically holds the grip part 142 (state where the first direction D1 is a vertical direction).

The housing 141 is provided at the upper end of the grip part 142. The grip part 142 extends downward from the central part of the lower surface of the housing 141 such that a front portion of the housing 141 projects in front of the grip part 142 and a rear portion of the housing 141 projects behind the grip part 142. Here, an angle formed by the first direction D1 and the second direction D2 is defined as an angle φ formed by the grip part 142 and the front portion of the housing 141. In the present embodiment, the angle φ is an acute angle, being larger than 0° and smaller than 90°.

In the state where the grip part 142 is vertically held, the front end of the housing 141 is located below the rear end of the housing 141, and the upper surface of the housing 141 is inclined obliquely downward from the rear end to the front end. In this case, the user can easily turn the upper surface of the housing 141 obliquely upward.

In the present embodiment, the upper surface of the housing 141 includes a front-part upper surface 141a, a central-part upper surface 141b, and a rear-part upper surface 141c. The front-part upper surface 141a, the central-part upper surface 141b, and the rear-part upper surface 141c are parallel to the second direction D2. Further, the front-part upper surface 141a, the central-part upper surface 141b, and the rear-part upper surface 141c are vertical to a plane including the first and second directions D1, D2. The front-part upper surface 141a and the rear-part upper surface 141c are on the same plane, and the central-part upper surface 141b is on a plane higher than the front-part upper surface 141a and the rear-part upper surface 141c.

A glass-made holding member having the plurality of markers 143 is housed inside the housing 141. The housing 141 is provided with a plurality of openings 141h through which the plurality of markers 143 in the housing 141 are exposed.

In the example of FIG. 3, seven markers 143 are provided in the housing 141. Three markers 143 are arranged in the front end of the housing 141, two markers 143 are arranged in the center, and two markers 143 are arranged in the rear end. The front-part upper surface 141a, the central-part upper surface 141b, and the rear-part upper surface 141c of the housing 141 are respectively provided with an opening 141h through which the three markers 143 in the front end are exposed, an opening 141h through which the two markers 143 in the center are exposed, and an opening 141h through which the two markers 143 in the rear end are exposed.

In this example, the three markers 143 in the front end of the housing 141 and the two markers 143 in the rear end are arranged so as to be located on the same plane. Further, the two markers 143 in the center are arranged so as to be located on a plane higher than the plane where the other markers 143 are located.

The three markers 143 in the front end are arranged so as to be exposed upward from the front-part upper surface 141a. The two markers 143 in the center are arranged so as to be exposed upward from the central-part upper surface 141b. The two markers 143 in the rear end are arranged so as to be exposed upward from the rear-part upper surface 141c.

A plurality of LEDs (light-emitting diodes), not shown, are provided in the housing 141 such that light is emitted from each marker 143. In this example, each LED is an infrared LED, and infrared rays with a wavelength of 860 nm are periodically emitted from each marker 143. The infrared rays emitted from the plurality of markers 143 pass through the plurality of openings 141h of the housing 141, and images of the infrared rays are captured by the main imaging unit 130 of FIG. 2.

The main imaging unit 130 of FIG. 2 is located obliquely above the placement table 120. As described above, the user can easily turn the upper surface of the housing 141 obliquely upward. Therefore, the main imaging unit 130 can efficiently capture an image of infrared rays emitted from the plurality of markers 143 of the probe 140 at the time of shape measurement of the measurement target S on the placement table 120.

As shown in FIG. 3, the stylus 144 is a stick member having a contact part 144a that can be brought into contact with the measurement target S. In the present embodiment, a spherical contact part 144a is provided at the tip of the stylus 144. An attachment part, not shown, for attaching the stylus 144 is formed on the front end surface and the lower surface of the housing 141. The user can arbitrarily change an attached position of the stylus 144 between the front end surface and the lower surface of the front end of the housing 141 in accordance with the shape of the measurement target S. In the example of FIG. 3, the stylus 144 is attached to the front end surface of the housing 141.

The power supply board 145 supplies electric power to the LED that causes the marker 143 to emit light. The power supply board 145 is housed inside the grip part 142. The connection terminal 146 is arranged on a lower part of the grip part 142. The timing for emitting light by the plurality of markers 143 is controlled by the control board 180 of FIG. 1 through a cable connected to the connection terminal 146. Note that the probe 140 and the control board 180 may be provided so as to be wirelessly communicable with each other. Further, the probe 140 may be directly connected to the processing device 200 by wire or wirelessly.

The sub-imaging unit 150 is a CCD (charge coupled device) camera, for example. A resolution of the sub-imaging unit 150 may be lower than a resolution of the main imaging unit 130. The sub-imaging unit 150 is arranged in a position whose positional relationship with the contact part 144a of the stylus 144 of the probe 140 is known. In the present embodiment, the sub-imaging unit 150 is arranged on the end surface of the front end of the housing 141 of the probe 140. A light reception signal is outputted from each pixel of the sub-imaging unit 150 to the control board 180.

As shown in FIG. 2, the display unit 160 is supported by the stand part 112 of the holding part 110, and is provided on the installation part 111 such that a display screen of the display unit 160 is turned obliquely upward. Accordingly, the user can selectively view the measurement target S and the display unit 160 by minimum movement of his or her eyes, or view the measurement target S and the display unit 160 at the same time.

The display unit 160 is configured by a liquid crystal display panel or an organic EL (electroluminescence) panel, for example. On the display unit 160, an image generated by the processing device 200, an operating procedure screen for the optical coordinate measuring device 300, a measurement result, and the like are displayed based on control by the control board 180.

The operation unit 170 has a plurality of operation buttons, for example. The operation unit 170 can be operated by the user at the time of designating a portion of the measurement target S to be measured, or at some other time. The operation unit 170 may be provided integrally with the probe 140. For example, in the grip part 142 of FIG. 3, one or a plurality of operation buttons may be provided as the operation unit 170. In this case, the user can operate the operation unit 170 while holding the grip part 142 with one hand.

The control board 180 is provided in the installation part 111 of the holding part 110. The control board 180 is connected to the main imaging unit 130, the probe 140, the sub-imaging unit 150, the display unit 160, and the operation unit 170. The processing device 200 controls operations of the main imaging unit 130, the probe 140, the sub-imaging unit 150, the display unit 160, and the operation unit 170 via the control board 180.

The control board 180 is mounted with an A/D convertor (analog/digital convertor) and a FIFO (first in, first out) memory, which are not shown. Light reception signals outputted from the main imaging unit 130 and the sub-imaging unit 150 are sampled by the A/D convertor of the control board 180 in a constant sampling period and also converted to digital signals. The digital signals outputted from the A/D convertor are sequentially stored into the FIFO memory. The digital signals stored into the FIFO memory are sequentially transmitted as pixel data to the processing device 200.

In the present embodiment, the timing for light emission by the plurality of light markers 143 of FIG. 3 is synchronized with the timing for imaging by the main imaging unit 130 of FIG. 2. Pixel data stored in a light emission period of the plurality of markers 143 is transmitted from the control board 180 to the processing device 200 in a next quenching period of the markers 143.

As shown in FIG. 1, the processing device 200 includes a storage unit 210, a control unit 220, and an operation unit 230. The storage unit 210 includes a ROM (read only memory), a RAM (random access memory), and a hard disk. A system program is stored into the storage unit 210. Further, the storage unit 210 is used for processing a variety of data and storing a variety of data such as pixel data from the measurement head 100.

The control unit 220 includes a CPU (central processing unit). In the present embodiment, the storage unit 210 and the control unit 220 are realized by a personal computer. The control unit 220 generates image data based on the pixel data from the measurement head 100. The image data is an aggregate of plurality of pieces of pixel data. The control unit 220 calculates a position of the contact part 144a of the stylus 144 of the probe 140 based on the generated image data.

The operation unit 230 includes a key board and a pointing device. The pointing device includes a mouse, a joy stick, or the like. The operation unit 230 is operated by the user.

(2) Configuration of Main Imaging Unit

FIG. 4 is a block diagram for describing a configuration of the main imaging unit 130. As shown in FIG. 4, the main imaging unit 130 includes the imaging element 131, the plurality of lenses 132 (only one lens 132 is schematically shown in FIG. 4), an imaging control unit 133, a memory 134, and an interface 135. Infrared rays emitted from the marker 143 of FIG. 3 are incident on the imaging element 131 through the plurality of lenses 132.

The imaging control unit 133 controls the timing for imaging by the imaging element 131. The memory 134 stores calibration information of the main imaging unit 130. The calibration information includes, as characteristics of the main imaging unit 130, an angle of view (viewing angle), the positional relationships between the imaging element 131 and the plurality of lenses 132, and an aberration among the plurality of lenses 132. The calibration information of the main imaging unit 130 will be described later.

The interface 135 is connected to the control board 180 (see FIG. 1). The imaging control unit 133 gives a light reception signal outputted from the imaging element 131 and calibration information stored into the memory 134 to the control board 180 via the interface 135.

Figure 5:
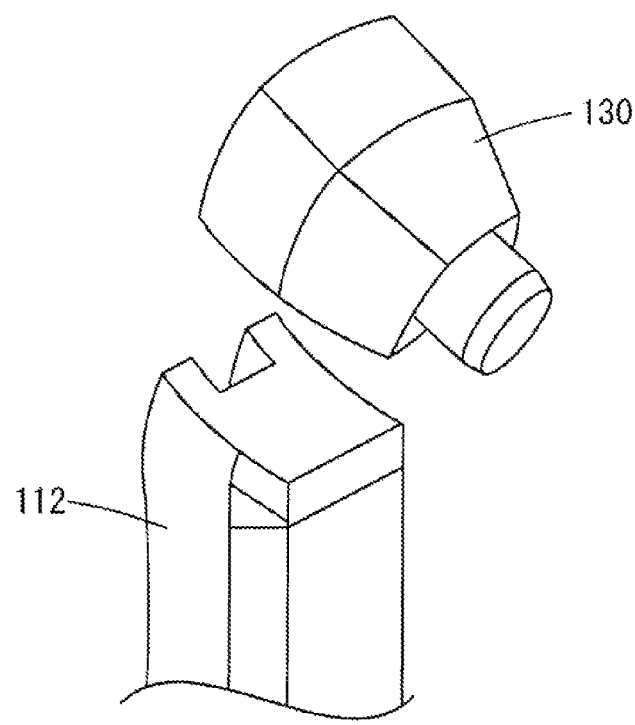
FIG. 5 is a schematic perspective view showing a state where the main imaging unit has been removed from a stand part.

FIG. 5 is a schematic perspective view showing a state where the main imaging unit 130 has been removed from the stand part 112. As described above, the main imaging unit 130 is configured detachably with respect to the stand part 112.

Figure 6A:
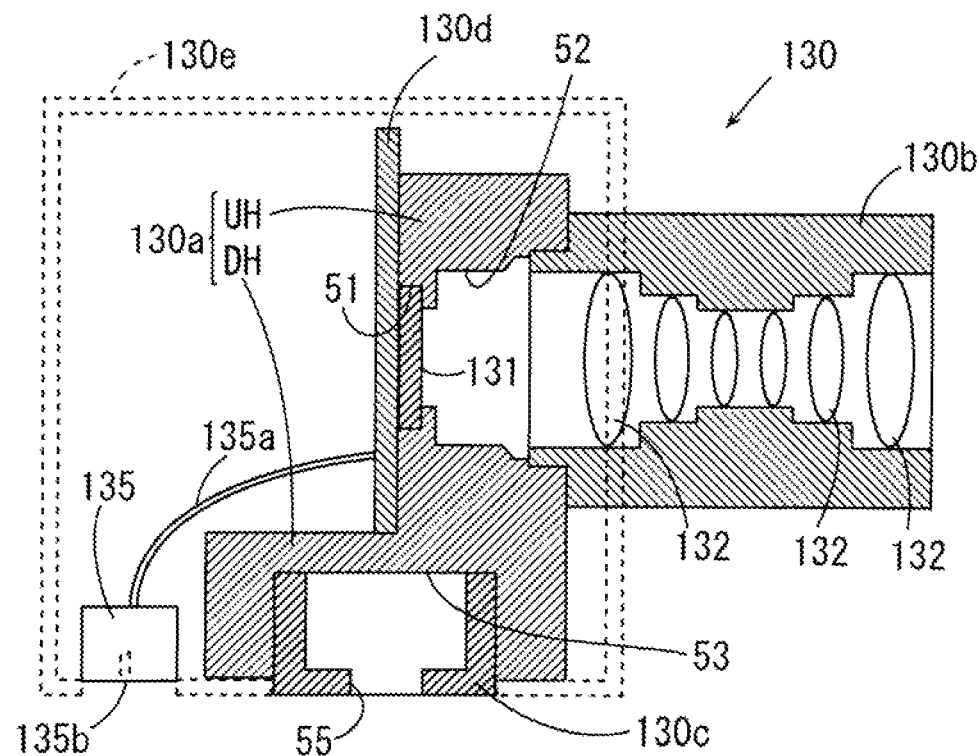
FIGS. 6A and 6B are views for describing one example of a specific configuration for detachment of the main imaging unit.
Figure 6B:
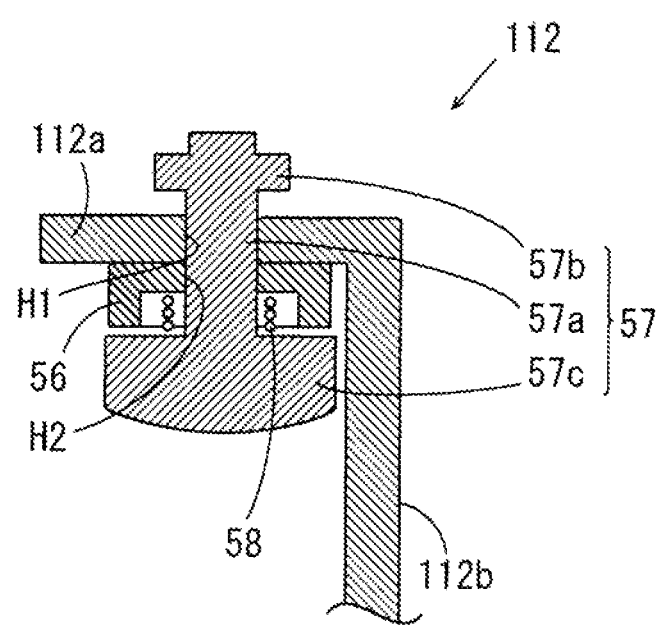

FIGS. 6A and 6B are views for describing one example of a specific configuration for detachment of the main imaging unit 130. FIG. 6A shows a cross section of the main imaging unit 130, and FIG. 6B shows a partial sectional view of the stand part 112. As shown in FIG. 6A, the main imaging unit 130 includes an element holding member 130a, a lens holding member 130b, an upper cramp member 130c, a circuit board 130d, and a casing 130e. The element holding member 130a, the lens holding member 130b, and the upper cramp member 130c are made of a metal material, for example. The element holding member 130a, the lens holding member 130b, and the upper cramp member 130c may be provided as a common member by integral molding.

The element holding member 130a has an upper holding part UH and a lower holding part DH. The upper holding part UH has one surface and another surface which are parallel to each other. A recess 51 is formed on one surface of the upper holding part UH. A through hole 52 is formed from the bottom surface of the recess 51 to the other surface of the upper holding part UH. A diameter of the through hole 52 gradually increases toward the other surface of the upper holding part UH.

The imaging element 131, the imaging control unit 133 (FIG. 4), and the memory 134 (FIG. 4) are each mounted on the circuit board 130d. In FIGS. 6A and 6B, the imaging control unit 133 and the memory 134 are not shown. The imaging element 131 is fitted to the recess 51 of the upper holding part UH. In order to prevent positional displacement of the imaging element 131, the imaging element 131 may be fixed in the recess 51.

One end of the lens holding member 130b is fitted to the end of the through hole 52 on the other surface side of the upper holding part UH. The lens holding member 130b has a cylindrical shape. The plurality of lenses 132 having various sizes are held by the lens holding member 130b. The plurality of lenses 132 overlap with the imaging element 131 and the through hole 52 of the upper holding part UH, and arranged such that optical axes thereof agree with each other.

The lower holding part DH are provided so as to project from the lower end of the upper holding part UH to the one surface side of the upper holding part UH. A recess 54 is provided on the lower surface of the lower holding part DH. An upper cramp member 130c is fitted to the recess 54. The upper cramp member 130c has a side wall part and a bottom part. A hole part 55 is provided on the bottom part of the upper cramp member 130c.

The interface 135 is arranged so as to be adjacent to the element holding member 130a. The interface 135 is connected with the circuit board 130d by a conductor wire 135a. A plug slot 135b is provided on the lower surface of the interface 135. The casing 130e is provided so as to house the element holding member 130a, the upper cramp member 130c, the circuit board 130d, and the interface 135. The casing 130e is provided with the hole part 55 of the upper cramp member 130c and an opening through which the plug slot 135b of the interface 135 is exposed.

As shown in FIG. 6B, the stand part 112 includes an upper plate part 112a and a side plate part 112b. The upper plate part 112a is provided so as to be substantially horizontal from the upper end part of the side plate part 112b. A lower cramp member 56 is fixed to the lower surface of the upper plate part 112a. A circular hole part H1 is provided in the upper plate part 112a. A hole part H2 is provided in the lower cramp member 56 so as to overlap with the hole part H1.

A fixing member 57 is attached so as to project above the upper plate part 112a and below the lower cramp member 56 through the hole parts H1, H2. The fixing member 57 includes a cylindrical part 57a, a pair of projection pieces 57b, and a grip part 57c. The cylindrical part 57a is inserted into the hole parts H1, H2. The pair of projection pieces 57b are provided so as to project on the upper side of the upper plate part 112a from the outer peripheral surface of the cylindrical part 57a. The grip part 57c is provided so as to extend in a substantially horizontal direction at the lower end of the cylindrical part 57a. The fixing member 57 is provided rotatably within a constant angle range with an axis of the cylindrical part 57a taken as the center. The user grips the grip part 57c and rotates the fixing member 57. An urging member 58 is attached between the lower cramp member 56 and the grip part 57c. The urging member 58 urges the fixing member 57 in an axial direction of the cylindrical part 57a.

Figure 7:
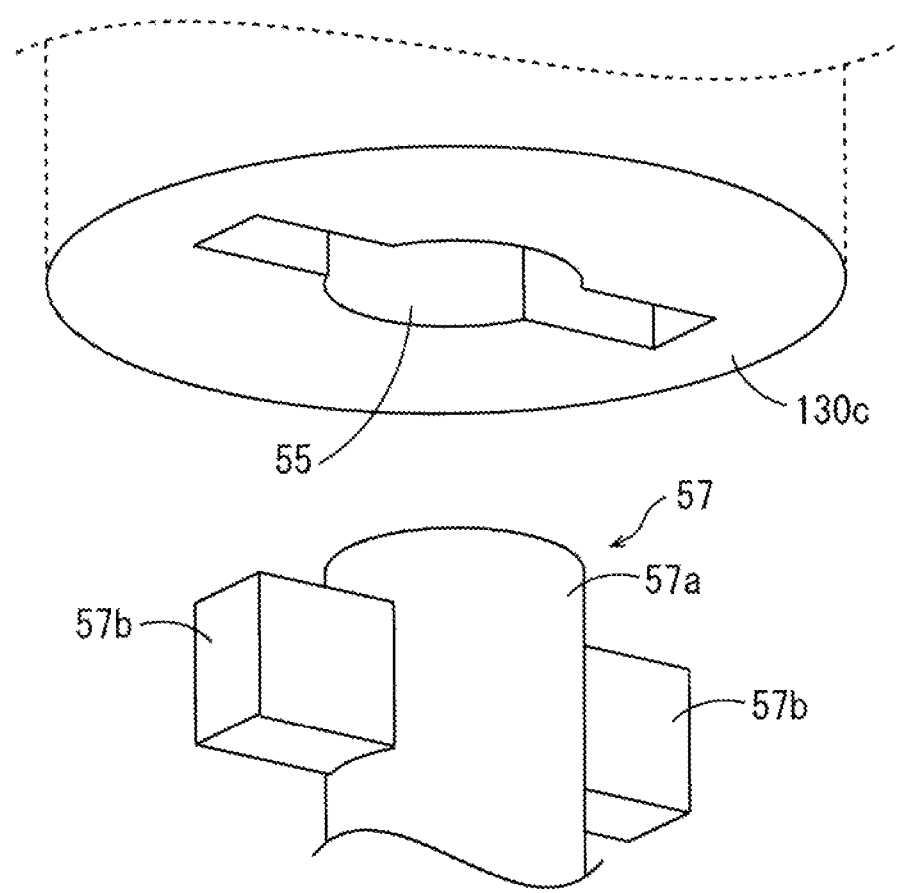
FIG. 7 is a view for describing a detachment method for the main imaging unit with respect to the stand part.
Figure 8:
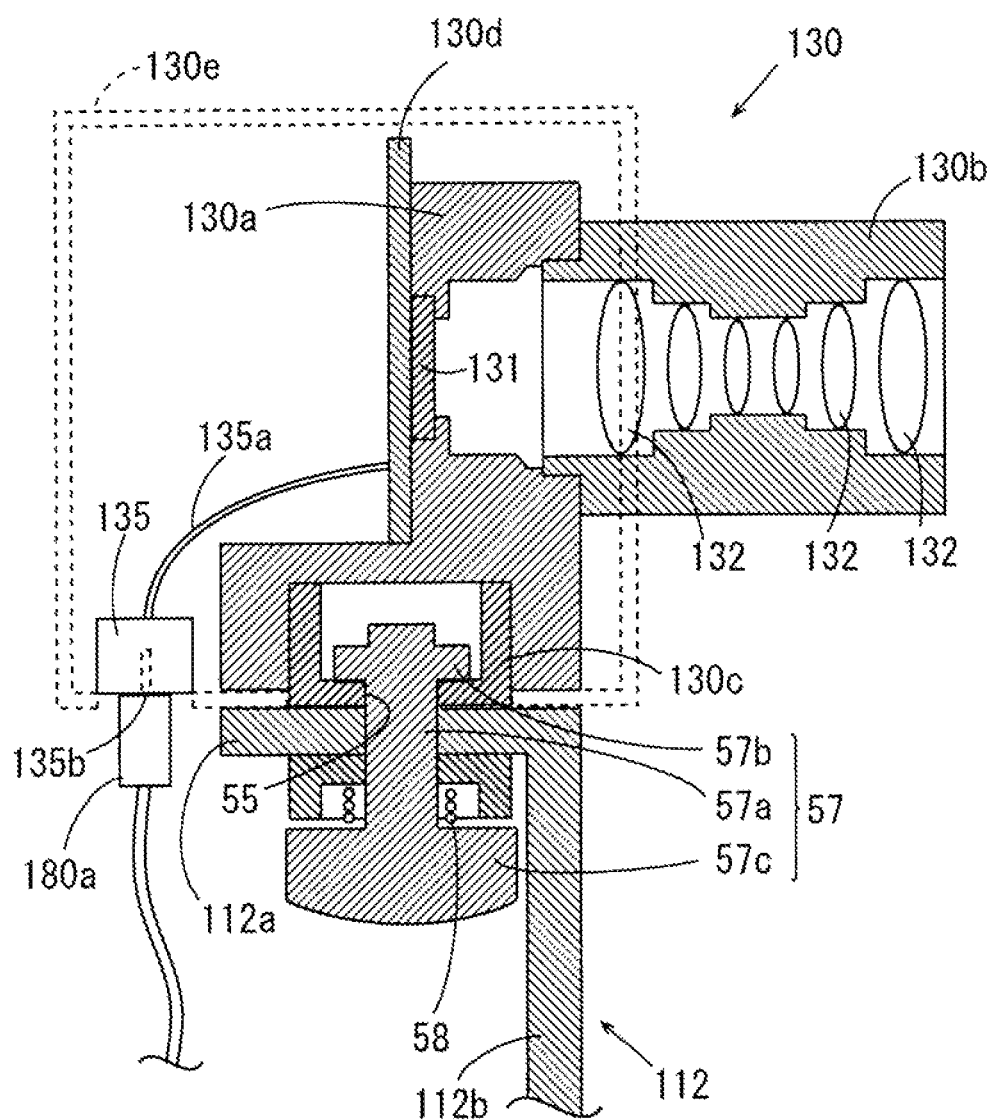
FIG. 8 is a view for describing a detachment method for the main imaging unit with respect to the stand part.

FIGS. 7 and 8 are views for describing a detachment method for the main imaging unit 130 with respect to the stand part 112. FIG. 7 shows part of the upper cramp member 130c of the main imaging unit 130 and part of the fixing member 57 of the stand part 112.

As shown in FIG. 7, a shape of the hole part 55 of the upper cramp member 130c corresponds to transverse sections of the cylindrical part 57a of the fixing member 57 and the pair of projection pieces 57b. When the main imaging unit 130 is attached to the stand part 112, an orientation of the projection piece 57b of the fixing member 57 is adjusted so as to agree with an orientation of the hole part 55 of the upper cramp member 130c. Under this state, the fixing member 57 is inserted into the hole part 55 of the upper cramp member 130c, and the fixing member 57 is rotated at a constant angle.

Thereby, as shown in FIG. 8, the projection piece 57b of the fixing member 57 is locked on the upper surface of the bottom part of the upper cramp member 130c. Further, urging force of the urging member 58 acts such that the projection piece 57b is pressed to the upper surface of the bottom part of the upper cramp member 130c. Hence, the upper cramp member 130c is fixed onto the stand part 112. This results in fixing of the main imaging unit 130 to the stand part 112.

An insertion plug 180a is inserted into the slot 135b of the interface 135 of the main imaging unit 130. The insertion plug 180a is connected to the control board 180 of FIG. 1. Hence, the main imaging unit 130 and the control board 180 are electrically connected. Under this state, power switches (not shown) of the measurement head 100 and the processing device 200 are respectively turned on, to thereby give calibration information stored in the memory 134 (FIG. 4) of the main imaging unit 130 to the control unit 220 via the control board 180.

On the other hand, when the main imaging unit 130 is removed from the stand part 112, the fixing member 57 is rotated such that the orientation of the hole part 55 of the upper cramp member 130c agrees with the orientation of the projection piece 57b of the fixing member 57. Under this state, the projection piece 57b of the fixing member 57 is pulled out through the hole part 55 of the upper cramp member 130c. Further, the insertion plug 180a is pulled out from the slot 135b of the interface 135.

In the example of FIGS. 6A to 8, the members placed between the imaging element 131 and the stand part 112 are only the element holding member 130a and the upper cramp member 130c. Hence, positional displacement of the imaging element 131 with respect to the stand part 112 hardly occurs, thereby ensuring the positional accuracy of the imaging element 131. Further, enhancement of the joint strength between the element holding member 130a and the upper cramp member 130c leads to further enhancement of the positional accuracy of the imaging element 131 with respect to the stand part 112. Moreover, enhancement of the joint strength between the element holding member 130a and the lens holding member 130b leads to enhancement of the position accuracy between the imaging element 131 and the plurality of lenses 132.

Although only one set of the upper cramp member 130c of the main imaging unit 130 and the lower cramp member 56 and the fixing member 57 of the stand part 112 is provided in the example of FIGS. 6A to 8, a plurality of sets of the above members may be provided in the main imaging unit 130 and the stand part 112.

(3) Modified Example of Main Imaging Unit and Stand Part

Figure 9:
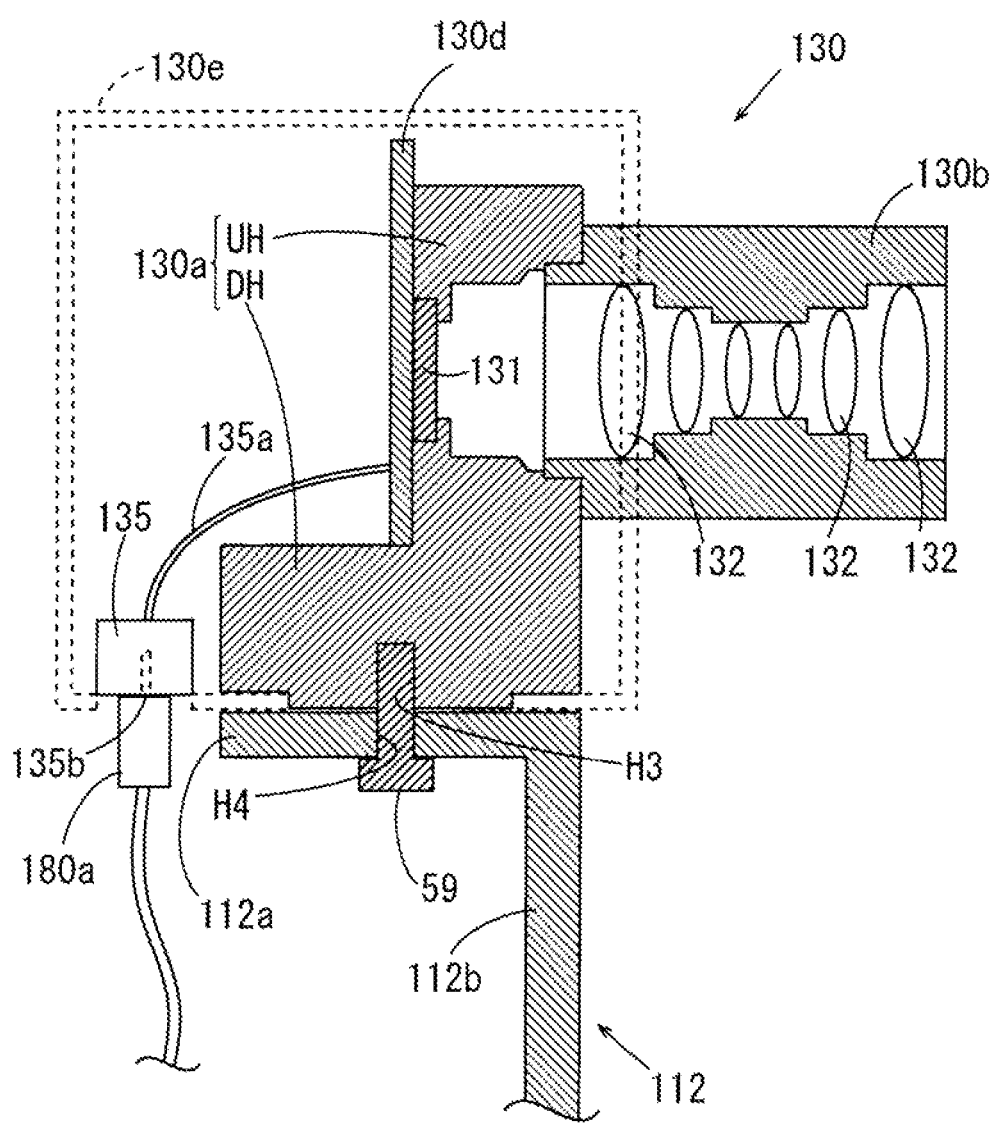
FIG. 9 is a sectional view showing a modified example of the main imaging unit and the stand part.

The configuration for detachment of the main imaging unit 130 is not limited to the above example. FIG. 9 is a sectional view showing a modified example of the main imaging unit 130 and the stand part 112. In the example of FIG. 9, points different from the example of FIGS. 6A to 8 will be described.

In the example of FIG. 9, a screw hole H3 is formed on the lower surface of the element holding member 130a of the main imaging unit 130. Further, a through hole H4 is formed in the upper plate part 112a of the stand part 112. A screw 59 is screwed into the screw hole H3 of the element holding member 130a through the through hole H4. Thereby, the main imaging unit 130 is fixed to the stand part 112. Further, by removing the screw 59, the main imaging unit 130 can be removed from the stand part 112.

In the example of FIG. 9, the member placed between the imaging element 131 and the stand part 112 is only the element holding member 130*a*, and hence the positional accuracy of the imaging element 131 with respect to the stand part 112 becomes high as compared to the example of FIG. 8.

Further, instead of fixing the main imaging unit 130 to the stand part 112 by use of the screw 59, the main imaging unit 130 may be fixed to the stand part 112 by use of a magnetic body.

(4) Internal Configuration of Probe

FIG. 10 is a block diagram showing an internal configuration of the probe 140 and the sub-imaging unit 150. As shown in FIG. 10, the probe 140 has the plurality of markers 143 (only three of them are shown in FIG. 10), a light emission control unit 149, a memory 147, and an interface 148. The light emission control unit 149 controls light emission of the plurality of markers 143. The memory 147 stores calibration information of the probe 140. The calibration information of the probe 140 is information for preventing deterioration in measurement accuracy in the probe 140 due to an individual difference, and includes the relative positional relationship among the plurality of markers 143 and the like.

The light emission control unit 149 and the memory 147 are provided on the power supply board 145 of FIG. 3, for example. The light emission control unit 149 gives the calibration information stored in the memory 147 to the control board 180 via the interface 148. The calibration information given to the control board 180 is given to the control unit 220 of the processing device 200 of FIG. 1.

The sub-imaging unit 150 has a sub-imaging element 151 and a sub-imaging control unit 152. The sub-imaging control unit 152 controls the timing for imaging by the sub-imaging element 151. Further, the sub-imaging control unit 152 gives image data acquired by the sub-imaging element 151 to the control board 180 via the interface 148.

(5) Detection by Main Imaging Unit

Figure 11:
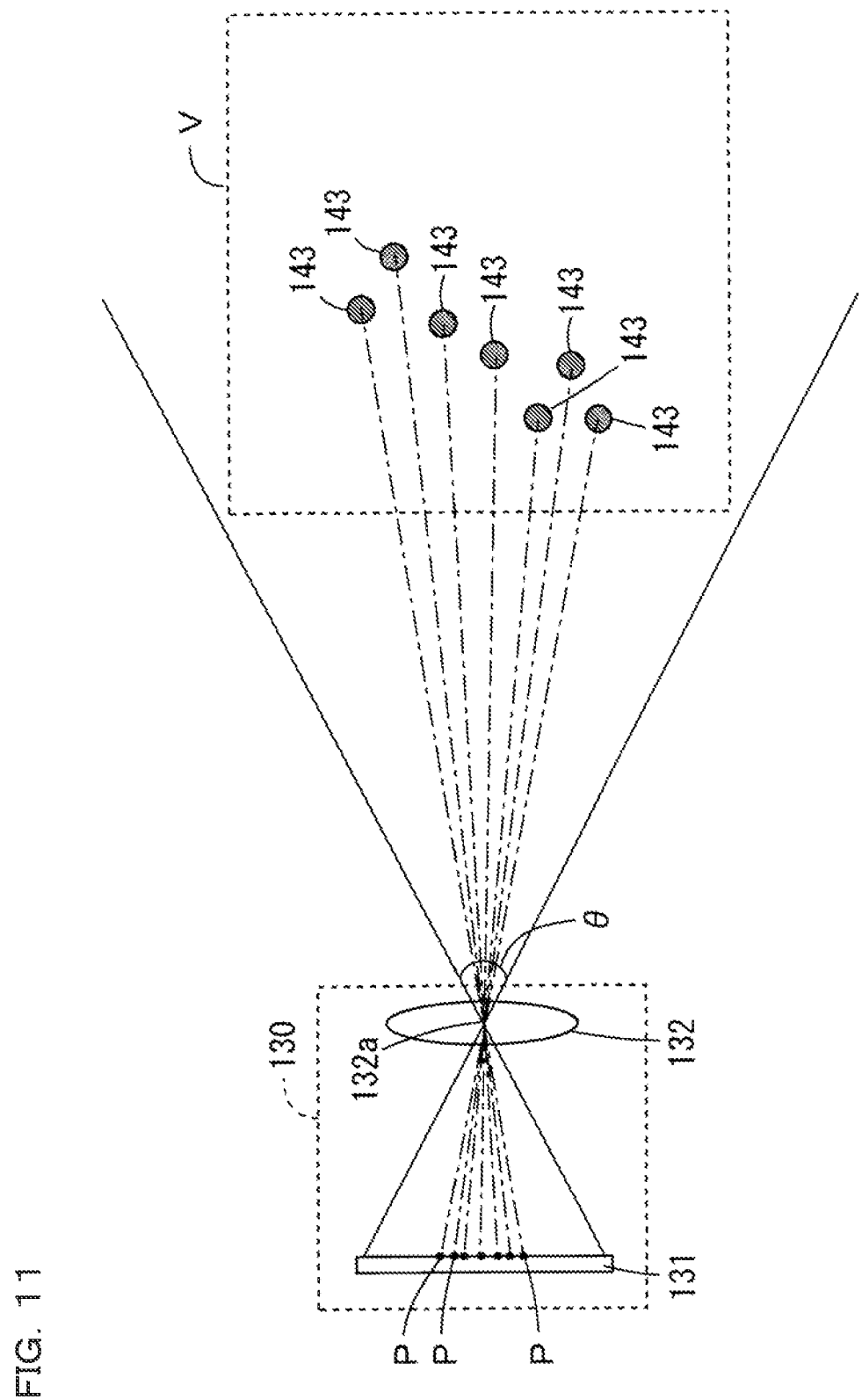
FIG. 11 is a schematic view for describing the relationships between the main imaging unit and a plurality of markers.

As described above, the main imaging unit 130 detects infrared rays emitted from the plurality of markers 143 of the probe 140. FIG. 11 is a schematic view for describing the relationships between the main imaging unit 130 and a plurality of markers 143. In FIG. 11, a description will be given using an optically simplified model having a similar function to that of a pin hole camera model in order to facilitate understanding. FIG. 11 shows only one lens 132 out of the plurality of lenses 132 of the main imaging unit 130, and light is guided to the imaging element 131 so as to pass through a main point 132*a* of the lens 132.

As shown in FIG. 11, the main imaging unit 130 has a constant angle of view (viewing angle) θ. The imaging region V is included within the range of the angle of view θ of the main imaging unit 130. When each of the plurality of markers 143 are located within the imaging region V, infrared rays emitted from those markers 143 are incident on the imaging element 131 through the main point 132*a* of the lens 132.

In this case, a direction from the main point 132*a* of the lens 132 to each marker 143 is specified based on a light reception position P of the imaging element 131. In the example of FIG. 11, as indicated by a dashed line, each marker 143 is located on each straight line passing through each light reception position P and the main point 132*a* of the lens 132. As described above, the relative positional relationship among the plurality of markers 143 is given as the calibration information of the probe 140 from the probe 140 to the control unit 220.

Based on the direction from the main point 132*a* of the lens 132 toward each marker 143 and the positional relationship among the plurality of markers 143, a position of the center of each marker 143 is unambiguously decided. Further, in the present embodiment, an x-axis, a y-axis, and a z-axis which are orthogonal to each other are defined, and an absolute position within the imaging region V is represented by three-dimensional coordinates. The control unit 220 of FIG. 1 calculates coordinates of the center of each marker 143 based on the light reception position P of the imaging element 131 and the previously stored positional relationship among the plurality of markers 143.

Based on the calculated coordinates of the center of each marker 143, coordinates of the contact position between the contact part 144*a* (FIG. 3) of the probe 140 and the measurement target S are calculated by the control unit 220 of FIG. 1.

For example, the positional relationship between the center of each marker 143 and the center of the contact part 144*a* (FIG. 3) is previously stored into the storage unit 210 of FIG. 1. Based on the calculated coordinates of the center of each marker 143 and the previously stored positional relationship between the center of each marker 143 and the center of the contact part 144*a*, coordinates of the center of the contact part 144*a* are specified.

Further, based on the coordinates of the center of each marker 143, an attitude of the probe 140 is specified. An orientation of the stylus 144 is thereby specified. Further, based on a change in coordinates of the center of each marker 143, a moving direction of the contact part 144*a* is specified. Normally, the contact part 144*a* is vertically brought close to the plane of the measurement target S with which it is to be brought into contact. Therefore, based on the specified orientation of the stylus 144 and the specified moving direction of the contact part 144*a*, the relative positional relationship between the center of the contact part 144*a* and the contact position is estimated. Based on the estimated positional relationship, coordinates of the contact position between the contact part 144*a* and the measurement target S are calculated from the coordinates of the center of the contact part 144*a*.

Note that a sensor for detecting a direction of force that is applied from the measurement target S to the contact part 144*a* may be provided in the probe 140. In this case, it is possible to calculate coordinates of the contact position between the contact part 144*a* and the measurement target S based on a result of detection by the sensor.

The calculated coordinates vary when there is an individual difference in the positional relationships between the imaging element 131 and the plurality of lenses 132, the positional relationship among the plurality of markers 143, the positional relationships between the plurality of markers 143 and the contact part 144*a*, or the like. Accordingly, it is preferable to perform calibration for preventing variation due to the individual difference before performing measurement by the optical coordinate measuring device 300. The calibration result may be held as specific data and the specific data may be referred to at the time of measurement of the measurement target, or based on the calibration result, the above individual difference in each positional relationship or the like may be adjusted before actual measurement is performed.

In the present embodiment, since the main imaging unit 130 is detachable with respect to the stand part 112, the main imaging unit 130 can be removed from the stand part 112 and calibrated. By the calibration of the main imaging unit 130, there is obtained calibration information including an angle of view (viewing angle) θ of the main imaging unit 130, the positional relationship in the optical axis between the imaging element 131 of the main imaging unit 130 and the lens 132, and an aberration among the plurality of lenses 132. The obtained calibration information is stored into the memory 134 (FIG. 4) of the main imaging unit 130.

As described above, when the control board 180 is connected to the interface 135 (FIG. 8) of the main imaging unit 130, the calibration information stored in the memory 134 is given to the control unit 220 of FIG. 1 via the control board 180. The control unit 220 performs measurement of coordinates of the measurement target based on the calibration information.

Normally, the calibration of the main imaging unit 130 is performed not by the user of the optical coordinate measuring device 300 but by an operator having specialized knowledge. For this reason, it is necessary that the main imaging unit 130 is transported to a specific place (factory, service center, etc.), or the operator visits an installation place of the optical coordinate measuring device 300. In the present embodiment, it is possible to transport only the main imaging unit 130 instead of transporting the whole of the optical coordinate measuring device 300. This facilitates operations (packing, loading, etc.) for transportation. Further, the operator is not required visit the installation place. Hence, it is possible to reduce labor, time, and cost for calibrating the main imaging unit 130.

Further, the probe 140 can also be singly transported and calibrated, and a result of the calibration can be stored as calibration information into the memory 147. The control unit 220 can accurately perform measurement of coordinates of the measurement target based on the calibration information given from the memory 147.

(6) Measurement Examples

Figure 12:
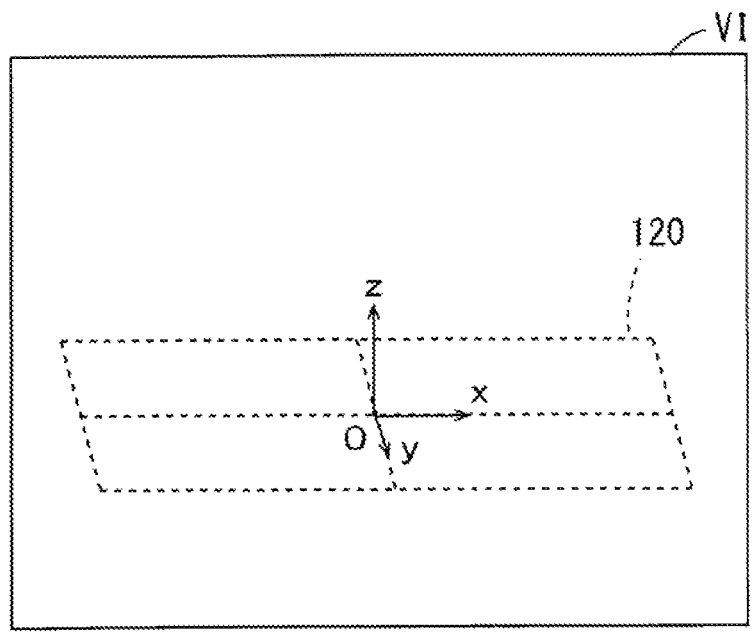
FIG. 12 is a view showing one example of an image displayed on a display unit of FIG. 2.
Figure 13:
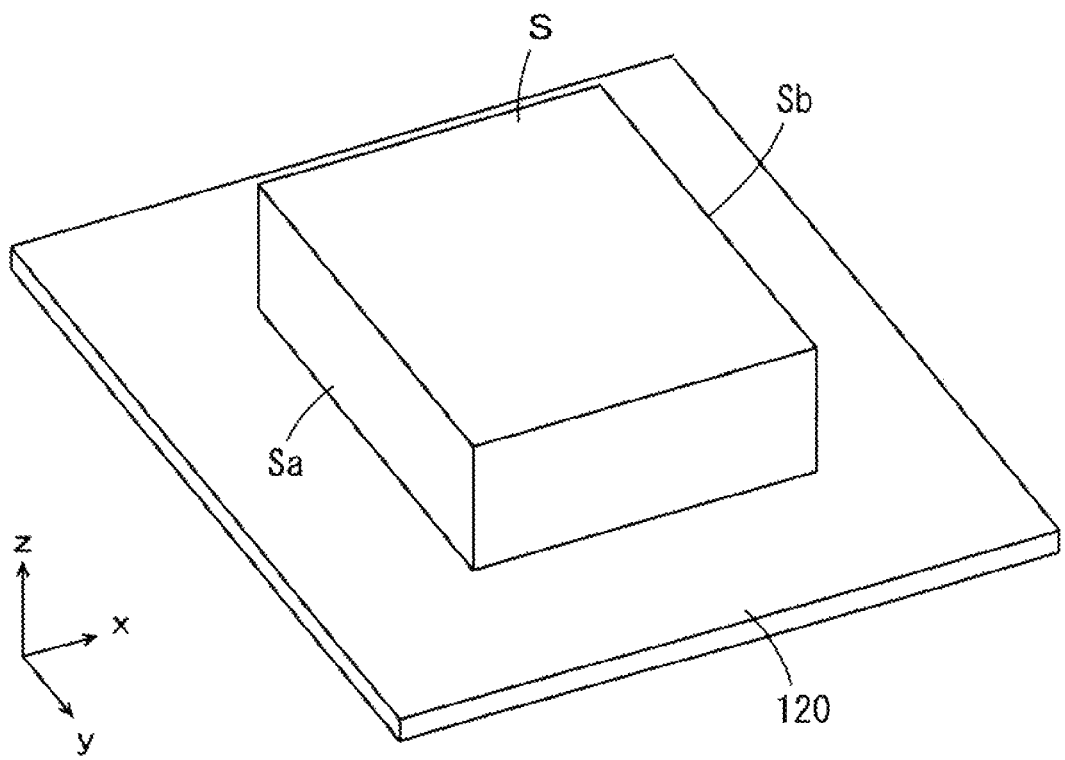
FIG. 13 is a view showing one example of a measurement target.

There will be described examples of measuring a size of the measurement target S by the optical coordinate measuring device 300. FIG. 12 is a view showing one example of an image displayed on the display unit 160 of FIG. 2. FIG. 13 is a view showing one example of the measurement target S.

FIG. 12 shows an image (hereinafter referred to as imaging-region virtual image) VI that virtually represents the imaging region V. As described above, the x-axis, the y-axis, and the z-axis are each set in the imaging region V. In this example, the x-axis and the y-axis are set so as to be parallel to the upper surface of the placement table 120 and orthogonal to each other, and the z-axis is set vertically to the upper surface of the placement table 120. Further, the center of the placement table 120 is set at an origin O. The imaging-region virtual image VI of FIG. 12 includes lines (dotted lines of FIG. 12) representing an outer periphery of the placement table 120, while including the origin O, the x-axis, the y-axis, and the z-axis.

The measurement target S of FIG. 13 has a rectangular parallelepiped shape. In this example, a distance between one side surface Sa of the measurement target S and a side surface Sb opposite to the side surface Sa is measured. The side surfaces Sa, Sb of the measurement target S are each vertical to the x-axis.

Figure 14A:
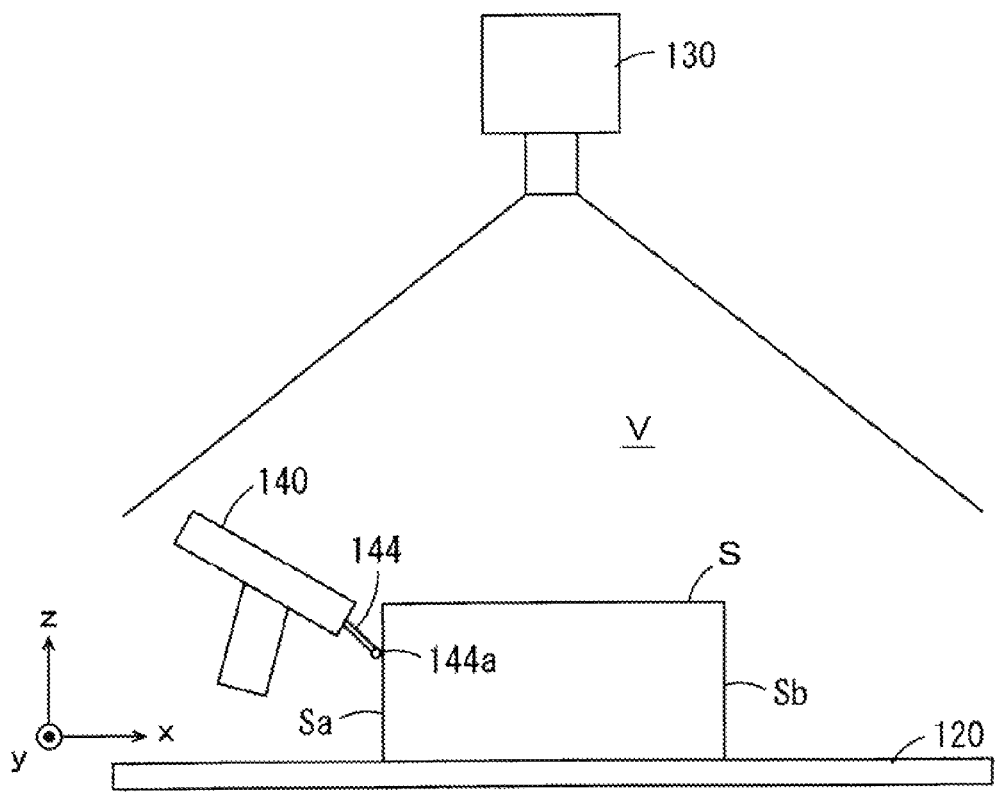
FIGS. 14A and 14B are views for describing a measurement example.
Figure 14B:
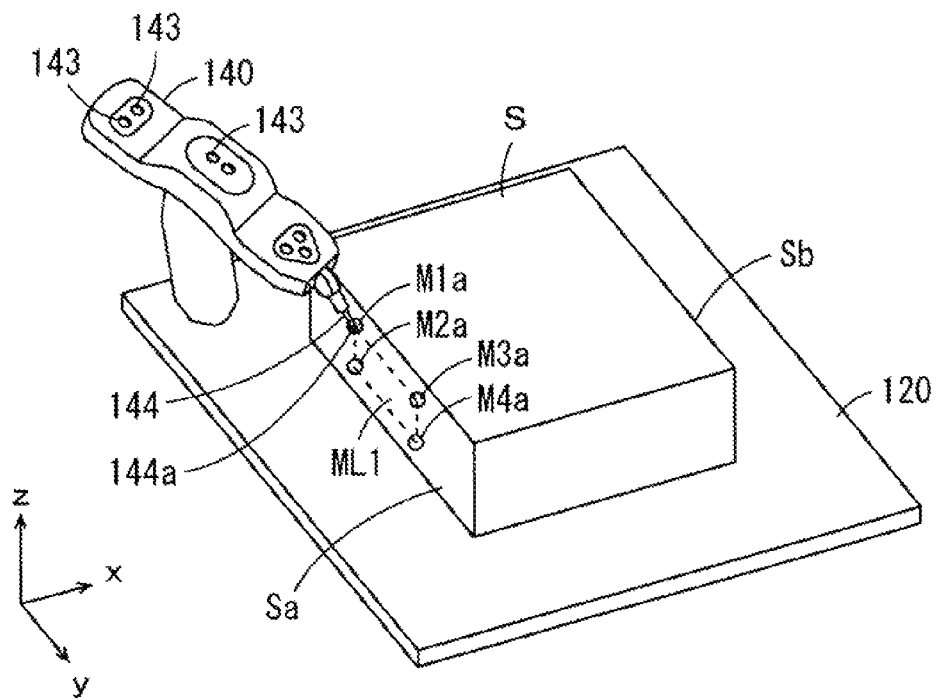
Figure 15:
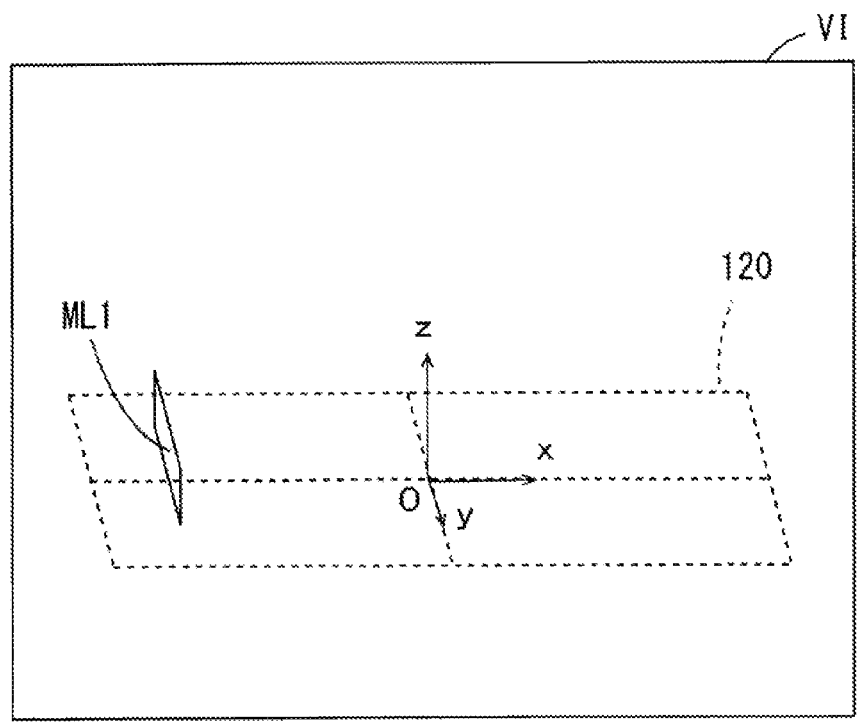
FIG. 15 is a view for describing the measurement example.
Figure 16A:
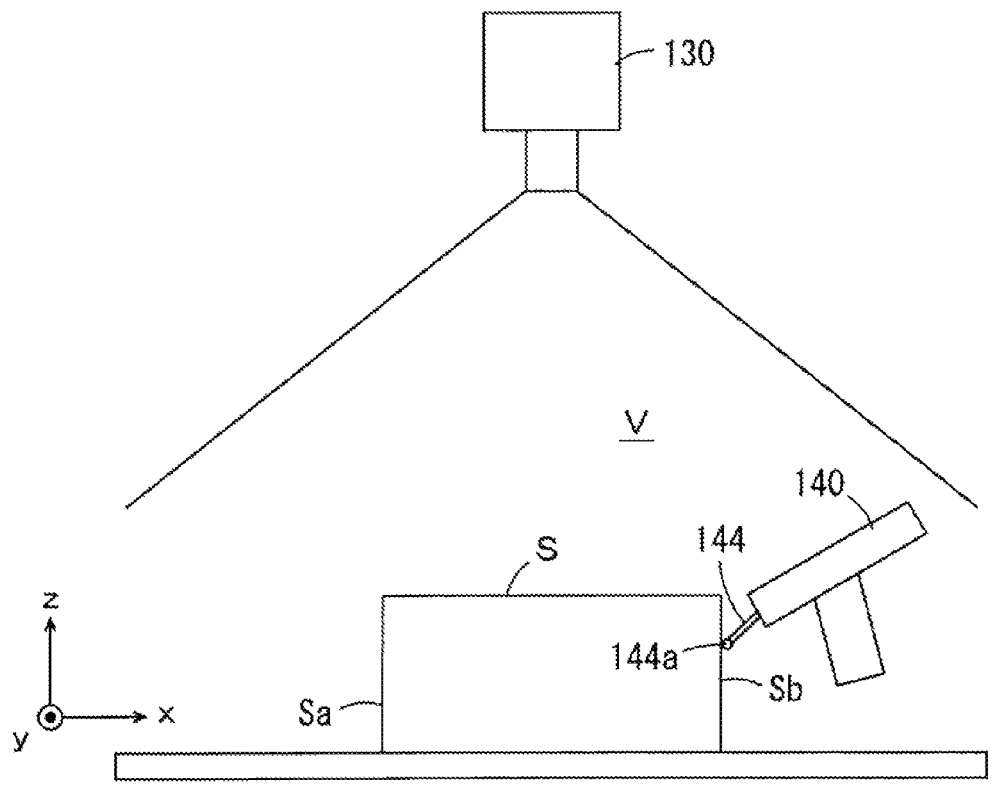
FIGS. 16A and 16B are views for describing a measurement example.
Figure 16B:
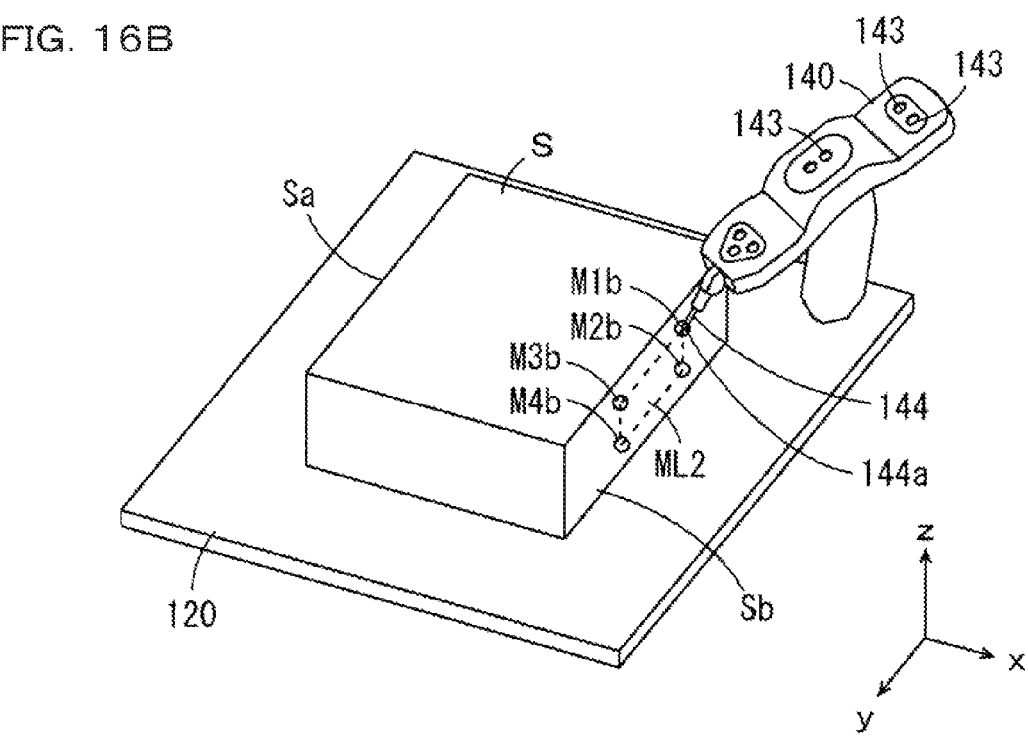
Figure 17:
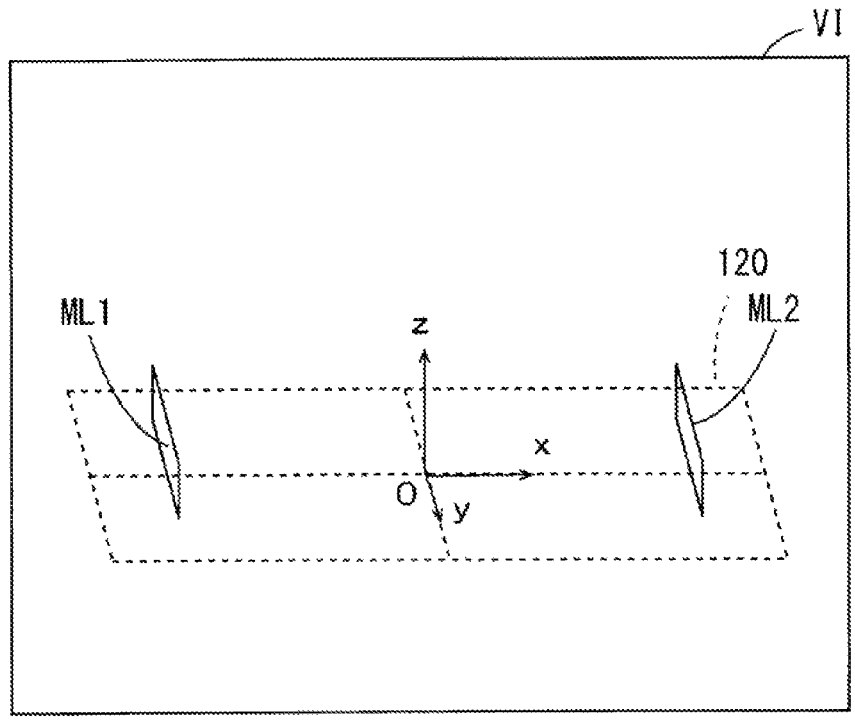
FIG. 17 is a view for describing the measurement example.
Figure 18:
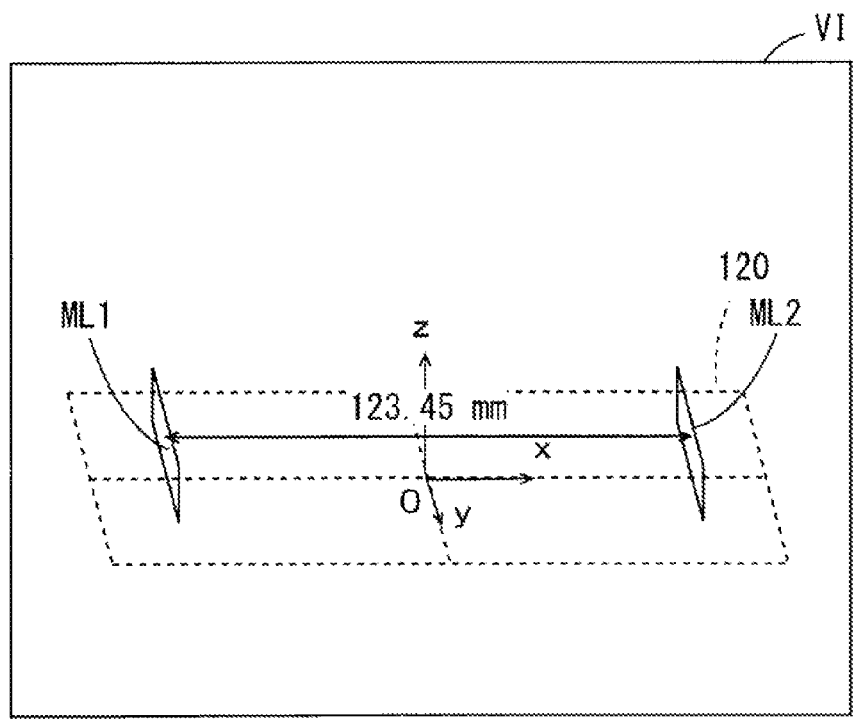
FIG. 18 is a view for describing the measurement example.

FIGS. 14A to 18 are views for describing specific measurement examples in the measurement target S of FIG. 13. FIGS. 14A and 16A are front views showing the positional relationship among the placement table 120, the main imaging unit 130, the probe 140, and the measurement target S, and FIGS. 14B and 16B are external perspective views of the probe 140 and the measurement target S. FIGS. 15, 17, and 18 show examples of the imaging-region virtual image VI displayed on the display unit 160.

As shown in FIGS. 14A and 14B, the contact part 144a of the stylus 144 is brought into contact with the side surface Sa of the measurement target S such that the plurality of markers 143 of the probe 140 are located within the imaging region V. By the operation unit 170 of FIG. 1 being operated under this state, the contact position between the measurement target S and the contact part 144a is set as a measurement position M1a, as shown in FIG. 14B. In this case, coordinates of the measurement position M1a are specified.

Similarly, three positions on the side surface Sa of the measurement target S are set as measurement positions M2a, M3a, M4a, and coordinates of the measurement positions M2a, M3a, M4a are specified. Subsequently, by the operation unit 170 or the operation unit 230 of FIG. 1 being operated, a plane passing through the measurement positions M1a to M4a is set as a measurement plane ML1 corresponding to the side surface Sa of the measurement target S. In this case, as shown in FIG. 15, the set measurement plane ML1 is superimposed on the imaging-region virtual image VI.

Subsequently, as shown in FIGS. 16A and 16B, the contact part 144a of the stylus 144 is brought into contact with the side surface Sb of the measurement target S such that the plurality of markers 143 of the probe 140 are located within the imaging region V. By the operation unit 170 of FIG. 1 being operated under this state, the contact position between the measurement target S and the contact part 144a is set as a measurement position M1b, as shown in FIG. 16B. In this case, coordinates of the measurement position M1b are specified.

Similarly, three positions on the side surface Sb of the measurement target S are set as measurement positions M2b, M3b, M4b, and coordinates of the measurement positions M2b, M3b, M4b are specified. Subsequently, by the operation unit 170 or the operation unit 230 of FIG. 1 being operated, a plane passing through the measurement positions M1b to M4b is set as a measurement plane ML2 corresponding to the side surface Sb of the measurement target S. In this case, as shown in FIG. 17, the set measurement plane ML2 is superimposed on the imaging-region virtual image VI in addition to the measurement plane ML1.

Subsequently, by the operation unit 170 or the operation unit 230 of FIG. 1 being operated, a distance between the decided measurement planes ML1 and ML2 is calculated in the control unit 220 of FIG. 1, and as shown in FIG. 18, the calculation result is displayed on the imaging-region virtual image VI. Note that the calculation result may be displayed on the display unit 160 separately from the imaging-region virtual image VI. Further, a condition for calculation of the distance between the two measurement planes and the like may be appropriately set by the user.

Although one measurement plane is decided based on the four measurement positions in this example, one measurement plane can be set based on three measurement positions at the minimum. Meanwhile, by setting four or more measurement positions, it is possible to more accurately set the measurement plane corresponding to the measurement target S. Further, based on four or more measurement positions, it is also possible to obtain the flatness of the plane of the measurement target S.

Moreover, although the plane (measurement plane) passing through the designated plurality of positions (measurement positions) is set as the target for measurement in this example, another geometrical shape may be set as the target for measurement in accordance with the shape of the measurement target. For example, a cylinder, a sphere, or the like passing through the designated plurality of positions may be set as the target for measurement. In this case, a diameter of a cross section of the set cylinder, a radius of the set sphere, or the like can be obtained. Further, an angle, an area, or the like with respect to the set geometrical shape may be obtained.

When the optical coordinate measuring device 300 according to the present embodiment is used for quality inspection of a manufactured component, a geometric characteristic to be measured is previously set in the optical coordinate measuring device 300 before measurement of the measurement target (manufactured component) is actually performed. The measurement of the measurement target is performed with respect to the geometric characteristic, and whether or not the measurement target has the shape as designed is inspected based on the measurement result. In this case, quality standards may be previously set in the optical coordinate measuring device 300 with respect to a plurality of respective geometric characteristics to be measured, and the optical coordinate measuring device 300 may compare measurement results of the measurement target with respect to the plurality of geometric characteristics and the previously set quality standards with respect to the plurality of geometric characteristics, to perform quality discrimination with respect to the respective geometric characteristics. Further, measurement procedures for the plurality of geometric characteristics and the quality standards with respect to the plurality of geometric characteristics may be previously set in the optical coordinate measuring device 300, and in addition to performing the quality discrimination with respect to the respective geometric characteristics, the optical coordinate measuring device 300 may perform comprehensive quality determination on the measurement target based on comparison results between the measurement results and the quality standards with respect to the plurality of geometric characteristics.

(7) Example of Use of Sub-Imaging Unit

By capturing an image of the measurement target S by the sub-imaging unit 150 of FIG. 3, the image of the measurement target S can be displayed on the display unit 160. Hereinafter, the image obtained by the sub-imaging unit 150 is referred to as a captured image.

The positional relationships between the plurality of markers 143 and the sub-imaging unit 150 and features (angle of view, distortion, etc.) of the sub-imaging unit 150 are previously stored as imaging information into the storage unit 210 of FIG. 1, for example. Accordingly, when the plurality of markers 143 are within the imaging region V, an image of a region captured by the sub-imaging unit 150 is recognized by the control unit 220 of FIG. 1. That is, a three-dimensional space corresponding to the captured image is recognized by the control unit 220.

As described above, information concerning the measurement (hereinafter referred to as measurement information) such as the measurement position and the measurement plane is set in the three-dimensional space. In the present embodiment, the measurement information can be associated with the captured image, and the measurement information can be superimposed and displayed on the captured image.

Figure 19:
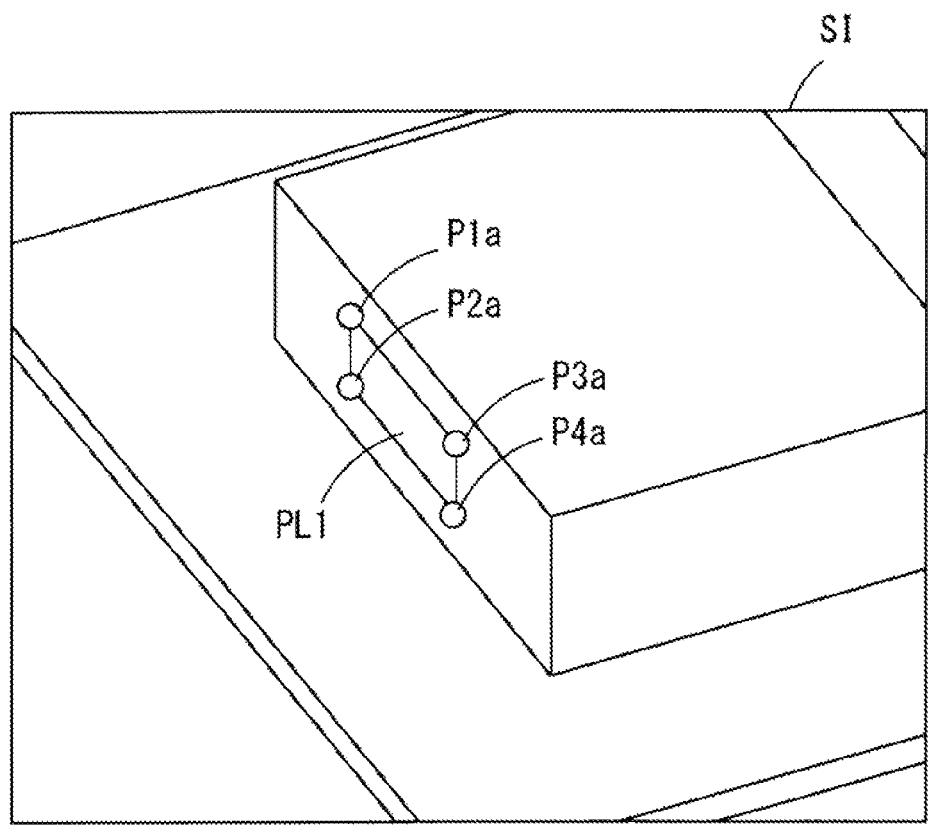
FIG. 19 is a view showing an example in which measurement information is superimposed and displayed on a captured image.

FIG. 19 is a view showing an example in which measurement information is superimposed and displayed on a captured image. In the example of FIG. 19, an image of the side surface Sa of the measurement target S is captured by the sub-imaging unit 150. On this captured image SI, an image PL1 representing the measurement plane ML1 is superimposed and a plurality of spherical images P1a to P4a representing the measurement positions M1a to M4a are also superimposed.

Thus, by superimposing the measurement information on the captured image obtained by actually capturing the image of the measurement target S, the user can easily visually grasp the measurement information. Further, in the case of performing measurement on one measurement target S and thereafter performing similar measurement on another measurement target S, the measurement on another measurement target S can be easily performed by referring to the captured image superimposed with the measurement information.

(8) Effect

In the optical coordinate measuring device 300 according to the above embodiment, the main imaging unit 130 is fixed by the stand part 112 in a constant attitude so as to capture an image of a previously set imaging region V. This eliminates the need for an operation for adjusting the position and the attitude of the main imaging unit 130. As a result, the measurement efficiency is improved. Further, since the imaging region V is limited, it is possible to perform measurement with high accuracy.

Moreover, since the main imaging unit 130 is detachable with respect to the stand part 112, calibration and maintenance of the main imaging unit 130 can be easily performed. This reduces a workload for keeping the accuracy of the main imaging unit 130.

Further, in the above embodiment, the main imaging unit 130 is fixed by the stand part 112 such that the main imaging unit 130 captures an image of a region obliquely below the main imaging unit 130. This prevents an increase in size of the optical coordinate measuring device 300.

Moreover, in the above embodiment, the stand part 112 is fixed to the installation part 111, the placement table 120 is provided in the installation part 111, and the region on the placement table 120 is captured as the imaging region V by the main imaging unit 130. The main imaging unit 130 and the placement table 120 are thus integrally held, to thereby facilitate handling of the optical coordinate measuring device 300. Further, the user can easily recognize the imaging region V, to thereby further improve the measurement efficiency.

Moreover, in the above embodiment, calibration information is stored into the memory 134 provided in the main imaging unit 130. In this case, even when the main imaging unit 130 is calibrated in a state where the main imaging unit 130 has been removed from the stand part 112, the obtained calibration information is not required be stored into the storage unit 210 of the processing device 200 or the like, but may only be stored into the memory 134 of the main imaging unit 130. This reduces a workload for calibration of the main imaging unit 130.

Further, in the above embodiment, the probe 140 is connected to the control board 180 or the processing device 200 by wire or wirelessly. This facilitates handling of the probe 140, to thereby facilitate specification of the measurement position by use of the probe 140, and also facilitate calibration and maintenance of the probe 140.

(9) Other Embodiments (9-1)

Although the installation part 111 and the stand part 112 of the holding part 110 are integrally provided in the above embodiment, the present invention is not limited thereto, and the stand part 112 may be detachable with respect to the installation part 111.

(9-2)

In the above embodiment, the LED is used as the marker of the probe 140, whose image is captured by the main imaging unit 130, but the marker of the probe 140 is not limited thereto. For example, another light emitting element such as a filament may be used as the marker. A non-light emitting unit having a specific color such as a fluorescent color may be used as the marker. A non-light emitting unit having a specific shape may be used as the marker.

(10) Correspondence Relationship Between Each Constitutional Element of Claims and Each Part of Embodiments Hereinafter, examples of the correspondence between each constitutional element of the claims and each part of the embodiments will be described, but the present invention is not limited to the following examples.

In the above embodiment, the optical coordinate measuring device 300 is an example of the optical coordinate measuring device, the marker 143 is an example of the marker, the probe 140 is an example of the probe, the main imaging unit 130 is an example of the imaging unit, the control unit 220 is an example of the calculation unit, the stand part 112 is an example of the fixing member, the installation part 111 is an example of the base, the placement table 120 is an example of the placement table, the memory 134 is an example of the first storage unit, the memory 147 is an example of the second storage unit, the grip part 142 is an example of the grip part, the housing 141 is an example of the body part, the first direction D1 is an example of the first direction, the second direction D2 is an example of the second direction, and the contact part 144a is an example of the contact part.

As each constitutional element of the claims, there can also be used other various elements having configurations or functions recited in the claims.

The present invention can be effectively used for measuring sizes and the like of various measurement targets.

What is claimed is:

1. An optical coordinate measuring device comprising:
a probe configured to designate a measurement position, and having a plurality of markers;
an imaging unit configured to capture an image of the plurality of markers;
a fixing member designed to fix the imaging unit in a predetermined constant attitude such that the imaging unit captures an image of a predetermined imaging region, wherein the imaging unit is detachable with respect to the fixing member; and
a calculation unit configured to calculate a coordinate point of a measurement position designated by the probe in the predetermined imaging region based on the plurality of markers in the image captured by the imaging unit fixed in the predetermined constant attitude by the fixing member, and configured to determine geometric characteristics based on the coordinate point of the measurement position designated by the probe and a geometric shape including at least one of a plane, a cylinder and a sphere.

2. The optical coordinate measuring device according to claim 1, wherein the fixing member fixes the imaging unit so as to capture an image of a region obliquely below the imaging unit.

3. The optical coordinate measuring device according to claim 1, further comprising:
a placement table on which a measurement target is placed; and
a base which holds the placement table,
wherein the fixing member is fixed to the base, and
the imaging unit captures an image of a region on the placement table as the imaging region.

4. The optical coordinate measuring device according to claim 1, wherein the imaging unit includes a first storage unit which stores first calibration information indicating characteristics of the imaging unit.

5. The optical coordinate measuring device according to claim 1, wherein the probe is connected to the calculation unit by wire or wirelessly.

6. The optical coordinate measuring device according to claim 5, wherein
the probe has
a grip part which is provided so as to extend in a first direction, and is gripped by a user, and
a body part which is provided at an upper end of the grip part so as to extend in a second direction, the second direction forming an angle with respect to the first direction,
the plurality of markers are provided on an upper surface of the body part, and
a contact part to be brought into contact with the measurement target is provided at an end of the body part.

7. The optical coordinate measuring device according to claim 1, wherein the probe includes a second storage unit which stores second calibration information indicating characteristics of the probe.

8. An optical coordinate measuring device comprising:
a probe configured to designate a measurement position, and having a plurality of markers;
an imaging unit configured to capture an image of the plurality of markers;
a fixing member designed to fix the imaging unit in a predetermined constant attitude such that the imaging unit captures an image of a predetermined imaging region, wherein the imaging unit is detachable with respect to the fixing member;
a first storage unit, disposed in the imaging unit, which stores first calibration information indicating characteristics of the imaging unit;
a second storage unit, disposed in the probe, which stores second calibration information indicating characteristics of the probe; and
a calculation unit configured to calculate a coordinate point of a measurement position designated by the probe in the predetermined imaging region based on the first calibration information indicating characteristics of the imaging unit, the second calibration information indicating characteristics of the probe, and the plurality of markers in the image captured by the imaging unit fixed in the predetermined constant attitude by the fixing member.

9. The optical coordinate measuring device according to claim 8, wherein the fixing member fixes the imaging unit so as to capture an image of a region obliquely below the imaging unit.

10. The optical coordinate measuring device according to claim 8, further comprising: a placement table on which a measurement target is placed; and a base which holds the placement table, wherein the fixing member is fixed to the base, and the imaging unit captures an image of a region on the placement table as the imaging region.

11. The optical coordinate measuring device according to claim 8, wherein the probe is connected to the calculation unit by wire or wirelessly.

12. The optical coordinate measuring device according to claim 11, wherein the probe has a grip part which is provided so as to extend in a first direction, and is gripped by a user, and a body part which is provided at an upper end of the grip part so as to extend in a second direction, the second direction forming an angle with respect to the first direction, the plurality of markers are provided on an upper surface of the body part, and a contact part to be brought into contact with the measurement target is provided at an end of the body part.

* * * * *